United States Patent
Komaki

(10) Patent No.: US 10,419,634 B2
(45) Date of Patent: Sep. 17, 2019

(54) IMAGE PROCESSING APPARATUS, IMAGE PROCESSING SYSTEM, IMAGE PROCESSING APPARATUS CONTROL METHOD, AND PROGRAM

(71) Applicant: KONICA MINOLTA, INC., Tokyo (JP)

(72) Inventor: Yoshio Komaki, Nishinomiya (JP)

(73) Assignee: Konica Minolta, Inc., Chiyoda-ku, Tokyo (JP)

( * ) Notice: Subject to any disclaimer, the term of this patent is extended or adjusted under 35 U.S.C. 154(b) by 0 days.

(21) Appl. No.: 16/193,280

(22) Filed: Nov. 16, 2018

(65) Prior Publication Data
US 2019/0215411 A1 Jul. 11, 2019

(30) Foreign Application Priority Data
Dec. 4, 2017 (JP) .................. 2017-232699

(51) Int. Cl.
H04N 1/00 (2006.01)
(52) U.S. Cl.
CPC ..... *H04N 1/00954* (2013.01); *H04N 1/00244* (2013.01); *H04N 1/00896* (2013.01); *H04N 2201/0094* (2013.01)
(58) Field of Classification Search
CPC ........... H04N 1/00954; H04N 1/00896; H04N 1/00244; H04N 2201/0094
See application file for complete search history.

(56) References Cited

U.S. PATENT DOCUMENTS

| | | | | |
|---|---|---|---|---|
| 2011/0099339 A1* | 4/2011 | Hagiwara | ............... | G03G 15/50 711/154 |
| 2014/0368862 A1* | 12/2014 | Ooba | .................... | G06F 3/1221 358/1.14 |

FOREIGN PATENT DOCUMENTS

JP 2015087935 A 5/2015

* cited by examiner

*Primary Examiner* — Kent Yip
(74) *Attorney, Agent, or Firm* — Buchanan Ingersoll & Rooney PC

(57) ABSTRACT

An image processing apparatus includes a hardware processor that is capable of performing mode control of causing the image processing apparatus to transition from a first operation mode to a second operation mode at a time when a plurality of services is not being executed, obtains service operation history information and manages service operation status in the past for each of time zones, and determines whether an operation target service is to be executed by the image processing apparatus or to be executed by an external resource in place of the image processing apparatus, wherein the plurality of services is classified into a substitute execution viable service and a substitute execution unviable service, and the hardware processor makes a determination to the effect that the operation target service is to be processed by substitute execution by the external resource.

26 Claims, 19 Drawing Sheets

| SERVICE | EXTERNAL SERVER SUBSTITUTION POSSIBILITY | TIME ZONE |
|---|---|---|
| S0: CONTROL SERVICE GROUP | × | |
| S1 | ○ | TB1 (0–22) |
| S2 | ○ | TB2 (14–16) |
| S3 | ○ | TB3 (6–) |

SA: {S0}
SB: {S1, S2, S3}

TA: Time Zone

FIG. 6

| DEVICE | SERVICE | TIME ZONE 0- 2- 4- 6- 8- 10- 12- 14- 16- 18- 20- 22- |
|---|---|---|
| MFP10 | S0 | |
| | S1 | |
| | S2 | |
| | S3 | |
| EXTERNAL SERVER 50a | S1 (SUBSTITUTE) | |
| EXTERNAL SERVER 50b | S2 (SUBSTITUTE) | |
| EXTERNAL SERVER 50c | S3 (SUBSTITUTE) | |

| DEVICE | SERVICE | TIME ZONE 0– 2– 4– 6– 8– 10– 12– 14– 16– 18– 20– 22– |
|---|---|---|
| MFP10 | S0 | TA |
| | S1 | |
| | S2 | |
| | S3 | |
| EXTERNAL SERVER 50a | S1 (SUBSTITUTE) | |
| EXTERNAL SERVER 50b | S2 (SUBSTITUTE) | |
| EXTERNAL SERVER 50c | S3 (SUBSTITUTE) | |

FIG. 10

| DEVICE | SERVICE | TIME ZONE 0- 2- 4- 6- 8- 10- 12- 14- 16- 18- 20- 22- |
|---|---|---|
| MFP10 | S0 | |
| | S1 | ←──────TA──────→ |
| | S2 | |
| | S3 | |
| EXTERNAL SERVER 50a | S1 (SUBSTITUTE) | |
| EXTERNAL SERVER 50b | S2 (SUBSTITUTE) | |
| EXTERNAL SERVER 50c | S3 (SUBSTITUTE) | |

| DEVICE | SERVICE | TIME ZONE 0- 2- 4- 6- 8- 10- 12- 14- 16- 18- 20- 22- |
|---|---|---|
| MFP10 | S0 | |
| | S1 | |
| | S2 | |
| | S3 | |
| EXTERNAL SERVER 50a | S1 (SUBSTITUTE) | S1 |
| EXTERNAL SERVER 50b | S2 (SUBSTITUTE) | S2 |
| EXTERNAL SERVER 50c | S3 (SUBSTITUTE) | S3 |

| DEVICE | SERVICE | TIME ZONE |  |  |  |  |  |  |  |  |  |  |
|---|---|---|---|---|---|---|---|---|---|---|---|---|
| | | 0– | 2– | 4– | 6– | 8– | 10– | 12– | 14– | 16– | 18– | 20– | 22– |
| MFP10 | S0 | | | | | | | | | | | | |
| | S1 | | | | | | | | | | | | |
| | S2 | | | | | | | | | | | | |
| | S3 | ▨ | ▨ | ▨ | | | | | | ▨ | ▨ | ▨ | ▨ |
| EXTERNAL SERVER 50a | S1 (SUBSTITUTE) | | | | | | | | | | | | |
| EXTERNAL SERVER 50b | S2 (SUBSTITUTE) | | | | | | | | | | | | |
| EXTERNAL SERVER 50c | S3 (SUBSTITUTE) | | | | ▨ | | | | | | | | |

TA — time range 8– to 16–

DAILY SERVICE OPERATION TIME POINT: →

| SERVICE | EXTERNAL SERVER SUBSTITUTION POSSIBILITY | TIME ZONE 0– 2– 4– 6– 8– 10– 12– 14– 16– 18– 20– 22– |
|---|---|---|
| S0: CONTROL SERVICE GROUP | × | |
| S1 | ○ | |
| S2 | ○ | |
| S3 | ○ | |

{ 210

| | EXECUTION DEVICE |
|---|---|
| S0 | NOT EXECUTING |
| S1 | EXTERNAL SERVER |
| S2 | MFP |
| S3 | EXTERNAL SERVER |

| SERVICE | EXTERNAL SERVER SUBSTITUTION POSSIBILITY | TIME ZONE | | | | | | | | | | | |
|---|---|---|---|---|---|---|---|---|---|---|---|---|---|
| | | 0- | 2- | 4- | 6- | 8- | 10- | 12- | 14- | 16- | 18- | 20- | 22- |
| S0: CONTROL SERVICE GROUP | × | | | | | | | | | | | | |
| S1 | ○ | | ▨ | ▨ | | ▨ | ▨ | ▨ | ▨ | ▨ | ▨ | ▨ | ▨ |
| S2 | ○ | | | | ▨ | | | | | ▨ | | | |
| S3 | ○ | | | | ▨ | | | | | | | | |

SA { S0
SB { S1, S2, S3

TA: 8– to 16–

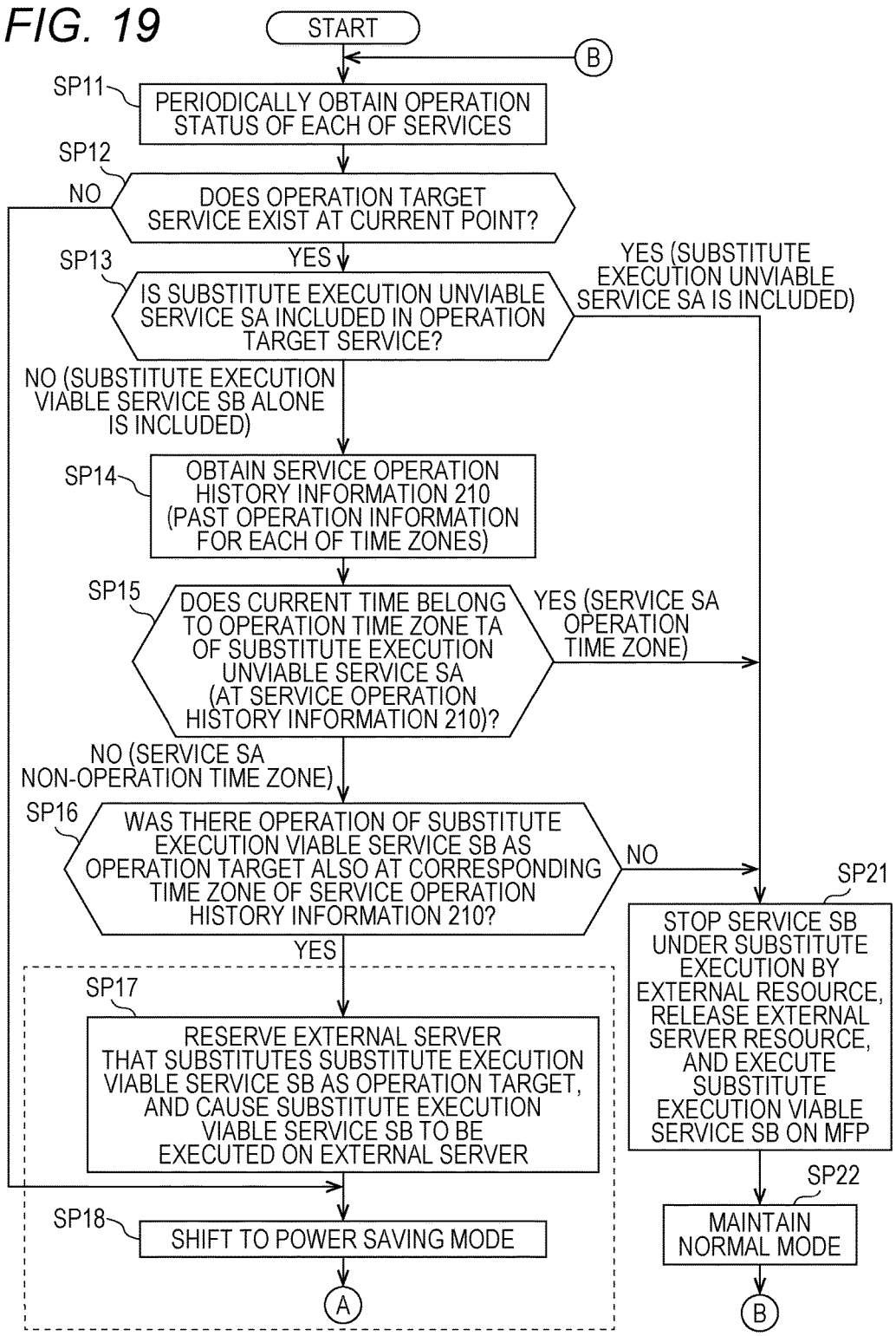

IMAGE PROCESSING APPARATUS, IMAGE PROCESSING SYSTEM, IMAGE PROCESSING APPARATUS CONTROL METHOD, AND PROGRAM

The entire disclosure of Japanese patent Application No. 2017-232699, filed on Dec. 4, 2017, is incorporated herein by reference in its entirety.

BACKGROUND

Technological Field

The present invention relates to an image processing apparatus such as a multi-functional peripheral (MFP), and related technologies.

Description of the Related Art

In general, an MFP (also referred to as an image processing apparatus) includes, as operation modes, a power saving mode (also referred to a sleep mode) in addition to a normal mode. In the power saving mode, it is possible to reduce the power consumption as compared with the normal mode.

In recent years, an MFP having a cooperation function with an external application has been proposed. Specifically, an external application installed in a client apparatus transmits a service execution request to the MFP via a communication network, and in response to the request, the MFP executes the service (specifically, processing of providing the service). However, the MFP cannot transition to the power saving mode during the period in which the MFP itself is executing the requested service. In particular, an increase in the frequency of execution of service on the MFP would make it difficult for the MFP to transition to the power saving mode, sometimes limiting a time zone for shifting to the power saving mode. Such a situation would hinder power saving of the MFP.

Conversely, there is a technology by which the MFP asks an external server (also referred to as an external resource) for a service (refer to JP 2015-87935 A). JP 2015-87935 A describes a technology by which an MFP asks a service providing apparatus (cloud server) that has a plurality of virtual machines and provides a cloud service for a service (image processing service) and the MFP receives a processing result of the service (image data) from the cloud server.

Meanwhile, it is conceivable that there is a service received by an MFP in response to a request from an external application (service on the basis of the request from the external application), and the MFP asks an external server (service providing apparatus) for execution of the requested service and causes the external server of the MFP to execute the service (substitute execution). With this method, the MFP would not need to execute the service on its own device, and hindrance of power saving of the MFP can be avoided.

However, it is often the case that using an external server involves payment of the usage fee for units of a predetermined time period, and therefore, using the external server to execute all the services received by the MFP would drastically increase the use cost of the external server.

SUMMARY

In view of this, an object of the present invention is to provide a technology capable of achieving power saving of an image processing apparatus while suppressing the use cost of external resources.

To achieve the abovementioned object, according to an aspect of the present invention, an image processing apparatus reflecting one aspect of the present invention comprises a hardware processor that is capable of performing mode control of causing the image processing apparatus to transition from a first operation mode to a second operation mode having power consumption smaller than in the first operation mode at a time when a plurality of services including a service provided in response to a request from an external application is not being executed in the image processing apparatus, obtains service operation history information that is associated with each of the plurality of services and manages service operation status in the past for each of time zones, and determines whether an operation target service being a service to be operated at a certain time point is to be executed by the image processing apparatus or to be executed by an external resource in place of the image processing apparatus, wherein the plurality of services is classified into a substitute execution viable service being a service executable by the external resource in place of the image processing apparatus and a substitute execution unviable service being a service executable by the image processing apparatus alone out of the image processing apparatus and the external resource and being a service not executable by substitute execution by the external resource, and in a case where the operation target service is the substitute execution viable service, the hardware processor makes a determination to the effect that the operation target service is to be processed by substitute execution by the external resource on condition that a judgment is made to the effect that the certain time point does not belong to an operation time zone of the substitute execution unviable service in an operation history on the basis of the service operation history information.

BRIEF DESCRIPTION OF THE DRAWINGS

The advantages and features provided by one or more embodiments of the invention will become more fully understood from the detailed description given hereinbelow and the appended drawings which are given by way of illustration only, and thus are not intended as a definition of the limits of the present invention:

FIG. 5 is a diagram illustrating an example of service operation history information regarding each of a plurality of services;

FIG. 6 illustrates an example of a determination result of an execution device of each of services for each of time zones;

FIG. 9 is a diagram illustrating an execution device of a substitute execution unviable service;

FIG. 10 is a diagram illustrating an execution device of service for each of time zones;

FIG. 11 is a diagram illustrating an execution device of service for each of time zones;

FIG. 12 is a diagram illustrating an execution device of service for each of time zones;

FIG. 13 is a diagram illustrating that a substitute execution viable service is going to be executed by an MFP in a case where the substitute execution viable service is executed in an operation time zone of the substitute execution unviable service;

FIG. 15 is a diagram illustrating that a substitute execution viable service is going to be executed by an external server when the operation time point of the substitute execution viable service belongs to the operation time zone in the operation history of the substitute execution viable service in a case where the substitute execution viable service is executed in a time zone other than the operation time zone of the substitute execution unviable service;

FIG. 18 is a diagram illustrating still another example of the service operation history information; and FIG. 19 is a flowchart illustrating operation according to a modification.

DETAILED DESCRIPTION OF EMBODIMENTS

Hereinafter, one or more embodiments of the present invention will be described with reference to the drawings. However, the scope of the invention is not limited to the disclosed embodiments.

1. First Embodiment

1-1. System Configuration

Figure 1:
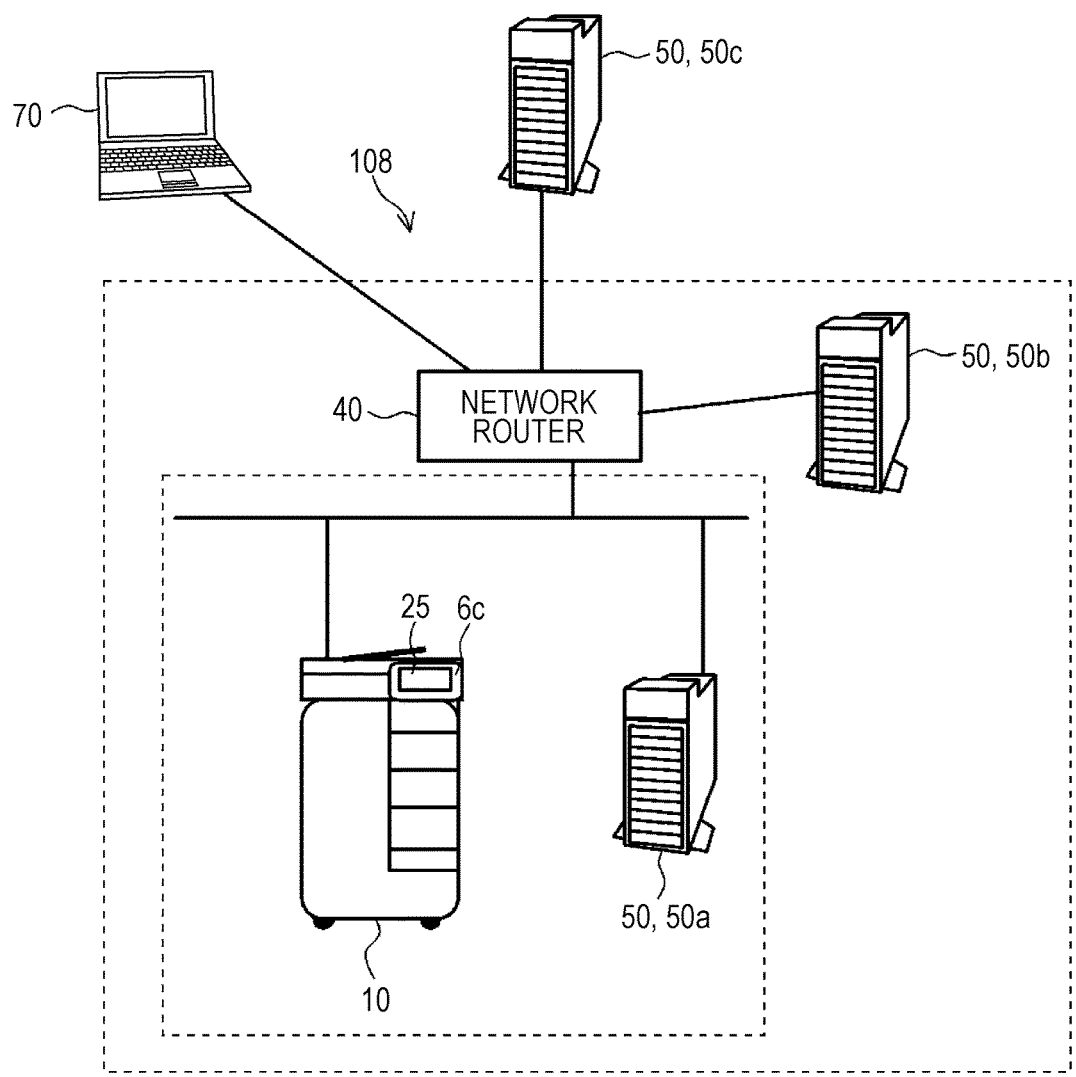
FIG. 1 is a schematic diagram illustrating a configuration of an image processing system.

FIG. 1 is a schematic diagram illustrating a configuration of an image processing system 1 according to a first embodiment of the present invention. As illustrated in FIG. 1, the image processing system 1 includes a multi-functional peripheral (MFP) 10 (image processing apparatus), a server computer 50 (50a, 50b, or 50c), and a client computer 70.

The MFP 10, each of the server computers (also referred to as external servers or simply servers) 50, and the client computer (also simply referred to as the client) 70 are connected to each other via a network 108. The network 108 is configured by a local area network (LAN), the Internet, or the like. Furthermore, a connection mode with respect to the network 108 may be a wired connection or a wireless connection.

Each of the servers 50 is an external device of the MFP 10 (external device) (external server) and is also expressed as being an external resource of the MFP 10. Each of the servers 50 may be a cloud server or an on-premises server. In addition, each of the servers 50 may be a server in a same LAN as the MFP 10 (within-LAN server), or may be a server existing outside the LAN (also referred to as an outside-LAN server). The server outside a LAN may be a server belonging to a same private network as the MFP 10 (also referred to as an inside-intranet server), or a server (outside-intranet server) belonging to a network other than a private network (network outside a private network).

Here, the MFP 10 and the server 50a are provided in a predetermined LAN, while the servers 50b and 50c and the client 70 are provided outside the predetermined LAN. Each of the devices in the LAN and each of the devices outside the LAN are connected via a network router 40. Furthermore, the server 50c is a cloud server (more specifically, a cloud server operated by another company), and the servers 50a and 50b are on-premises servers (servers operated by the company). The servers 50a and 50b are also expressed as servers provided in an intranet of a company in which the MFP 10 is installed. In addition, the server 50a is a server within the same LAN as the MFP 10, while the server 50b is also expressed as a server belonging to a network different from the LAN to which the MFP 10 belongs.

As will be described below, the MFP 10 can execute a service in response to a request from an external application (application installed in an external device of the MFP 10 (the client 70)). Additionally, the MFP 10 can also execute a service in response to a request from an internal application (application installed inside the MFP 10).

As will be described below, some of the plurality of services received by the MFP 10 (substitute execution viable service SB to be described below) are executable (substitute execution) not merely by the MFP 10 itself, but also by external resources of the MFP 10 (external resources). In other words, the external resource is a device (or a device group) capable of processing by substitute execution at least some of the various services received by the MFP 10. Examples of the external resources include the above-described various servers 50a, 50b, and 50c.

The MFP 10 determines whether a service (operation target service) to be operated at a certain time point is going to be executed by the MFP 10 or executed (substitute execution) by an external resource in place of the MFP 10. If all the operation target services are processed by substitute execution by external resources, the MFP 10 can transition to the power saving mode. In other words, in a case where none of the all the services including the service provided in response to the request from the external application is being executed in the MFP 10, the MFP 10 can transition to the power saving mode.

Note that, however, in order to use the external resource (external server 50), a usage fee for a predetermined time unit (1-hour unit, 2-hours unit, etc.) arises. Using the external server to execute (by substitute execution) all the services received by the MFP would drastically increase the use cost of the external server.

To cope with this, in the present embodiment, the use of the external server is appropriately restricted so as to achieve power saving of the MFP 10 while suppressing the use cost of external resources. Details will be described below.

Figure 4:
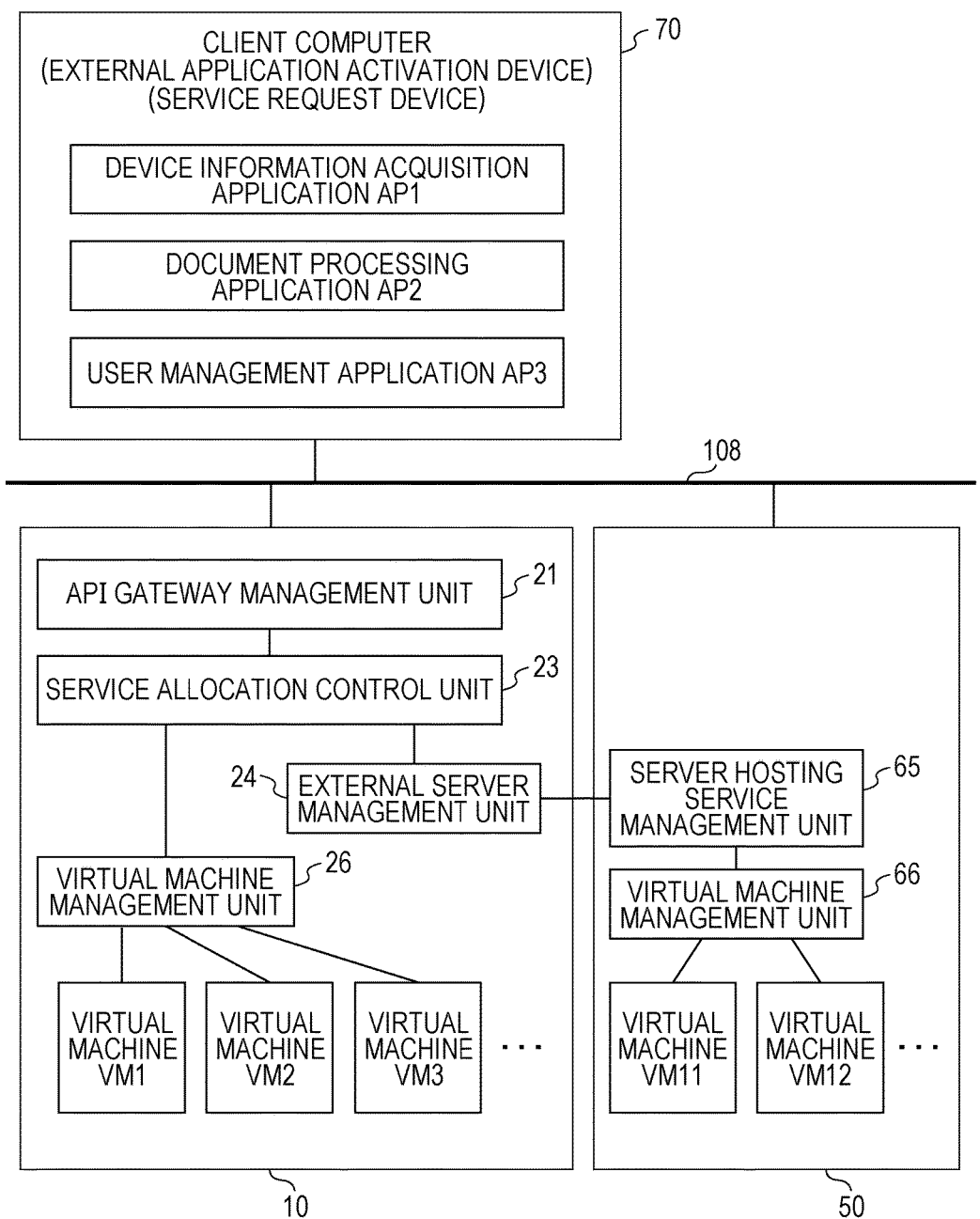
FIG. 4 is a diagram illustrating a software configuration or the like in each of devices.

In each of the servers 50 (50a, 50b, and 50c), a plurality of virtual machines VM (VM 11, VM 12, . . . (refer to FIG. 4)) is constructed. Each of the virtual machines VM (VM 11, VM 12, . . . ) is constructed with service processing application software (server application) being installed on a guest operating system (OS). Each of the virtual machines VM is also referred to a virtual server (virtual server resource). The external resources of the MFP 10 include virtual server resources or the like constructed in the virtual machine VM in the external device (external server, or the like). Note that FIG. 4 is a diagram illustrating a software configuration or the like in each of the devices 10, 50, and 70.

Also in the MFP 10, a plurality of virtual machines VM (VM 1, VM 2, . . . (refer to FIG. 4)) is constructed. Each of the virtual machines VM (VM 1, VM 2, . . . ) in the MFP 10 has a configuration similar to each of the virtual machines VM (VM 11, VM 12, . . . ) in the external server 50. The virtual machine VM (VM 1, VM 2, . . . ) in the MFP 10 is a virtual machine inside the MFP 10, and thus, it is also referred to an internal resource (internal virtual server resource) or the like.

As will be described below, the MFP 10 (a service allocation control unit 23) determines which of the virtual machines (virtual machines VM (VM 1, VM 2, . . . ) inside the MFP 10) or which of the external resource virtual machines VM (VM 11, VM 12, . . . )) is to be used as a machine to which each of the operation target services received by the MFP 10 is to be allocated.

1-2. Configuration of MFP 10

Figure 2:
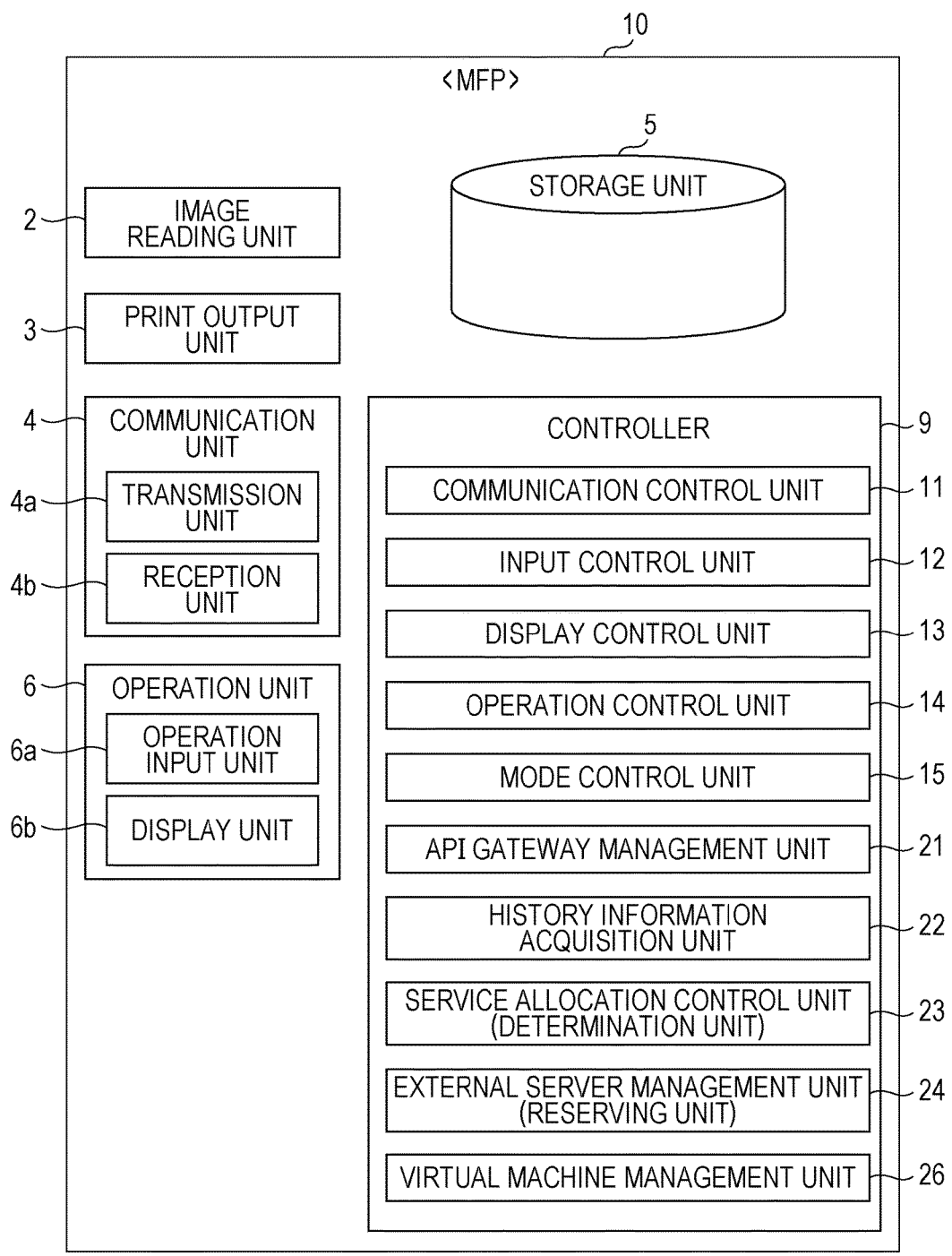
FIG. 2 is a diagram illustrating functional blocks of an MFP.

FIG. 2 is a diagram illustrating functional blocks of the multi-functional peripheral (MFP) 10.

The MFP 10 is an apparatus (also referred to as a multi-functional device) including a scan function, a copy function, a facsimile function, and a box storage function. Specifically, as illustrated in the functional block diagram of FIG. 2, the MFP 10 includes an image reading unit 2, a print output unit 3, a communication unit 4, a storage unit 5, an operation unit 6, and a controller 9. The MFP 10 causes combined operation of these units to be allowed to implement various functions. The MFP 10 is also expressed as an image processing apparatus, an image forming apparatus, or the like.

The image reading unit 2 is a processing unit that optically reads (or scans) a document mounted at a predetermined position of the MFP 10 to generate image data of the document (also referred to as a document image or a scanned image). This image reading unit 2 is also referred to as a scanning unit.

The print output unit 3 is an output unit that prints and outputs an image on various media such as a sheet of paper on the basis of data related to a print target. The MFP 10 is also an electrophotographic printer (full color printer), and the print output unit 3 has various hardware mechanisms such as an exposure unit, a developing unit, a transfer unit, and a fixing unit.

The communication unit 4 is a processing unit capable of performing facsimile communication via a public line or the like. Furthermore, the communication unit 4 can perform network communication via the network 108. This network communication uses various protocols such as Transmission Control Protocol/Internet Protocol (TCP/IP). The network communication enables the MFP 10 to exchange various data with desired destinations (for example, the server 50 and the client 70). The communication unit 4 includes a transmission unit 4a that transmits various data and a reception unit 4b that receives various data.

The storage unit 5 is configured with a storage device such as a hard disk drive (HDD).

The operation unit 6 includes an operation input unit 6a for receiving an operation input to the MFP 10 and a display unit 6b for displaying and outputting various types of information. The MFP 10 includes a substantially plate-shaped operation panel unit 6c (refer to FIG. 1), and the operation panel unit 6c includes a touch panel 25 (refer to FIG. 1) on its front side. The touch panel 25 is configured by embedding a piezoelectric sensor or the like in a liquid crystal display panel, and can display various types of information and can receive an operation input from an operator. For example, the touch panel 25 displays various screens (including button images) such as a menu screen. An operator can perform operation such as changing various settings of the MFP 10 by pressing buttons (buttons represented by button images) virtually arranged in the touch panel 25. The touch panel 25 also functions as a portion of the operation input unit 6a and also functions as a portion of the display unit 6b.

The controller (control unit) 9 is a control device built in the MFP 10 to comprehensively control the MFP 10. The controller 9 is configured as a computer system including a CPU and various semiconductor memories (RAM and ROM). The controller 9 executes predetermined software programs (hereinafter, also simply referred to as programs) stored in a ROM (for example, EEPROM (registered trademark)) in the CPU so as to implement various processing units. Note that the program (more specifically, a program module group) may be recorded in a portable recording medium such as a USB memory, read out from the recording medium, and installed in the MFP 10. Alternatively, the program may be downloaded via a network or the like and installed in the MFP 10.

Specifically, as illustrated in FIG. 2, the controller 9 executes the program to implement various processing units including: a communication control unit 11, an input control unit 12, a display control unit 13, an operation control unit 14, the mode control unit 15, an API gateway management unit 21, a history information acquisition unit 22, a service allocation control unit 23, an external server management unit 24, and a virtual machine management unit 26.

The communication control unit 11 is a processing unit that controls a communication operation with another device (such as the server 50). For example, the communication control unit 11 receives a service request command or the like from the client 70, and transmits a reserving instruction (of external resources), etc. to the server 50 in cooperation with the communication unit 4, the external server management unit 24, or the like.

The display control unit 13 is a processing unit that controls display operation on the display unit 6b. The display control unit 13 causes the display unit 6b to display an operation screen or the like for operating the MFP 10.

The input control unit 12 is a control unit that controls operation of an operation input to the operation input unit 6a. For example, the input control unit 12 controls operation of receiving an operation input onto the operation screen.

The operation control unit 14 is a control unit that controls print output operation, scan operation, facsimile communication operation, or the like in the MFP 10.

The mode control unit 15 (also referred to as a sleep control unit) is a processing unit that controls an operation mode (normal mode/power saving mode) in the MFP 10. For example, when the plurality of services is not executed in the MFP 10, the mode control unit 15 can transition the MFP 10 itself from the "normal mode" to the "power saving mode". Here, the "power saving mode" is an operation mode having lower power consumption than the "normal mode". The "power saving mode" is also referred to as a sleep mode or the like. In the power saving mode, power supply is stopped to portions other than a necessary portion for detecting service request (service request detection portion (processing unit (communication unit 4, etc.) for service request detection))) from an external application and a local operation unit (operation unit of the MFP 10 itself). Power consumption can be greatly reduced by limiting power supply. When a service request from the external application and the local operation unit is detected, the MFP 10 can restart power supply to shift to the normal mode, and can continue execution of the detected service in the normal mode.

The API gateway management unit 21 is a processing unit that receives a request related to the service from the client 70 (external application). The API gateway management unit 21 receives a request from the client 70 (external application) by using an Application Programming Interface (API).

Note that when there is a service determined by the service allocation control unit 23 (described below) to be executed by external resources, the MFP 10 gives a route change command about this service to the router 40. After giving the route change command, the service is executed by the external resource without interposing the MFP 10, by directly accessing an external resource (such as the external server 50) from the client 70 (without going through the API gateway management unit 21). With this arrangement, in a case where the MFP 10 includes the power saving mode or the like, the service requested from the client 70 is executable by the external resource while the MFP 10 maintains the power saving mode (sleep state). The present invention, however, is not limited to this. It is allowable to include a function (transfer processing unit or the like) of transferring a request to an allocated external server with reference to the information determined by the service allocation control unit 23 (described below) into a part of the service request detection function (service request detection portion, or the like) that is in operation (with the power supply being maintained) in the power saving mode as well. In other words, the request may be transferred to an allocated external server by using a transfer processing unit or the like that maintains power supply even in the power saving mode. With this configuration, it is possible to execute the service requested from the client 70 by the external resource without asking the router 40 for the route change while the MFP 10 maintains the power saving mode.

At a time point of completion of the hourly rental of the external resource, the service being executed on the external resource (in other words, the execution device (the external resource) of the service) instructs the router 40 (or the service request detection portion of the MFP 10) on a route change so as to change the route so that the MFP 10 will receive a request from the client 70. With this arrangement, it is possible to change the route without a need to return the MFP 10 from the sleep state (return from sleep).

The history information acquisition unit 22 is a processing unit that extracts and obtains from the storage unit 5 service operation history information 210 (refer to FIG. 5) stored in the storage unit 5. The service operation history information 210 (described below) is service operation history information regarding each of a plurality of services while being service operation history information that manages service operation statuses in the past for each of time zones.

The service allocation control unit 23 is also referred to as a service allocation determination unit (or simply a determination unit) or the like. The service allocation control unit 23 is a processing unit that determines which of the virtual machines (virtual machines inside the MFP 10 or virtual machines as external resources) is to be used as a machine to which each of the operation target services received by the MFP 10 in response to the request from the external application, is to be allocated. In other words, the service allocation control unit 23 is a processing unit that determines which of the MFP 10 and the external resource (such as the server 50) is to execute each of the operation target services received by the MFP 10. In other words, the service allocation control unit 23 determines whether each of the operation target services is to be executed by the MFP 10 itself (original request destination device), which is a direct request destination of the service, or to be processed by substitute execution by the server 50 (substitute device). The service allocation control unit 23 also manages the service execution operation in cooperation with the external server management unit 24 and the virtual machine management unit 26 (also refer to FIG. 4).

The virtual machine management unit 26 (virtual machine management unit in the MFP 10) is a processing unit that manages the virtual machines VM (VM 1, VM 2, . . . ) inside the MFP 10 (refer to FIG. 4).

The external server management unit 24 is also referred to as an external resource reserving unit (or simply reserving unit) or the like. The external server management unit 24 is a processing unit that reserves an external resource to execute an operation target service in a case where a determination is made to the effect that the operation target service is to be executed (substitute execution) by the external resource (external device) in place of the MFP 10 (original request-receiving device). Specifically, the external server management unit 24 cooperates with a server hosting service management unit 65 (refer to FIGS. 3 and 4) in the server 50 and with a virtual machine management unit 66 in the server 50 or the like so as to reserve external resources (external virtual server resources, etc.) for executing the operation target service. The external server management unit 24 also executes releasing processing of the reserved external resources.

Specifically, the external server management unit 24 transmits an external resource reserving command or the like to the server 50 (server hosting service management unit 65) so as to reserve a virtual machine resource (external resource), or the like, in the server 50. Additionally, the external server management unit 24 transmits an external resource release command or the like to the server 50 (server hosting service management unit 65) so as to release the virtual machine resource (external resource), or the like, in the server 50.

In addition, the external server management unit 24 can exchange data (also referred to as virtual server data), etc. used for substitute execution of the operation target service (substitute execution viable service SB) or the like with the server 50 (server hosting service management unit 65). With the data or the like exchanged in accordance with the reservation or release of the external resource, it is possible to take over and execute the processing that has been executed so far by another execution device even in a case where the execution device of the operation target service is switched between the MFP 10 and the server 50 (external resource). Examples of the data (virtual server data) used in substitute execution include snapshot data of a disk image of a virtual server executing an operation target service. The data is created in an open virtualization format (OVF) compatible between virtual machines of different types.

1-3. Configuration of Server 50

Figure 3:
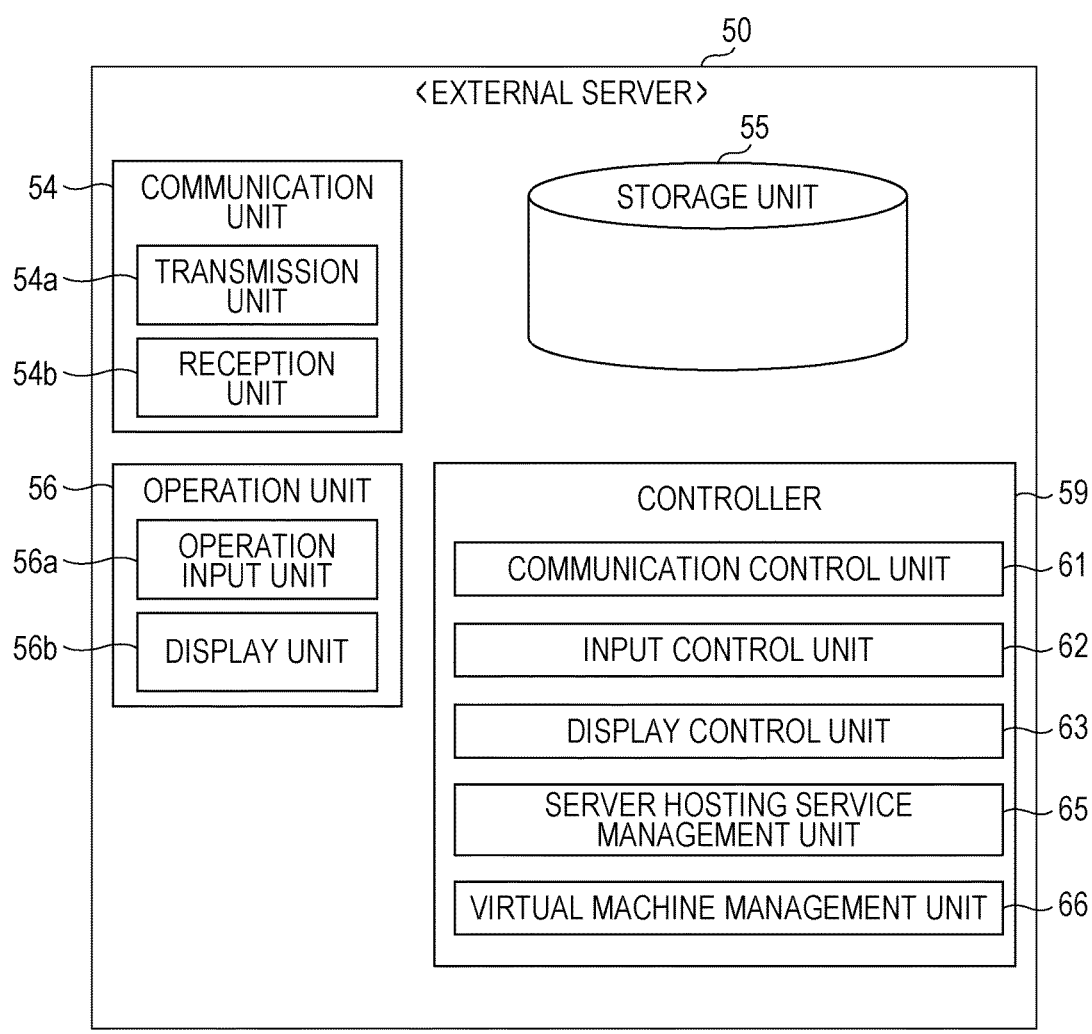
FIG. 3 is a diagram illustrating functional blocks of a server.

Next, a configuration of the server 50 will be described with reference to FIG. 3. FIG. 3 is a diagram illustrating functional blocks of the server 50.

The server 50 is constituted by an information processing apparatus such as a computer device. The server 50 is also expressed as a management server or the like. Furthermore, since the server 50 is a server external to the MFP 10, it is also referred to as an external server or an external resource (of the MFP 10).

As illustrated in the functional block diagram of FIG. 3, the server 50 includes a communication unit 54, a storage unit 55, an operation unit 56, a controller 59, or the like. The server 50 causes combined operation of these units to be allowed to achieve various functions.

The communication unit 54 can perform network communication via the network 108. This network communication uses various protocols such as Transmission Control Protocol/Internet Protocol (TCP/IP). The network communication enables the server 50 to exchange various data with desired destinations (for example, the MFP 10). The communication unit 54 includes a transmission unit 54a that transmits various data and a reception unit 54b that receives various data.

The storage unit 55 is configured with a storage device such as a hard disk drive (HDD).

The operation unit 56 includes an operation input unit 56a for receiving an operation input to the server 50 and a display unit 56b for displaying and outputting various types of information.

The controller (control unit) 59 in FIG. 3 is a control device built in the server 50 to comprehensively control the server 50. The controller 59 is configured as a computer system including a CPU and various semiconductor memories (RAM and ROM). The controller 59 executes predetermined programs (OS, applications, etc.) stored in a memory unit (semiconductor memory or the like) in the CPU to implement various processing units. Note that the program (specifically, a program module group) may be recorded in a portable recording medium (such as a CD-ROM and a USB memory), read from the recording medium, and installed in the server 50. Alternatively, the program may be downloaded via a network or the like and installed in the server 50.

The controller 59 executes the program to implement various processing units including the communication control unit 61, the input control unit 62, the display control unit 63, the server hosting service management unit 65, and the virtual machine management unit 66.

The communication control unit 61 is a processing unit that controls communication operation with the MFP 10 or the like in cooperation with the communication unit 54 or the like. For example, the communication control unit 61 controls operation of transmission and reception of commands (command from the MFP 10 and command to the MFP 10) regarding the determination on external resources and reserving of external resources in cooperation with the server hosting service management unit 65, the communication unit 54, or the like The input control unit 62 is a control unit that controls operation of an operation input to the operation input unit 56a.

The display control unit 63 is a processing unit that controls display operation on the display unit 56b or the like.

The virtual machine management unit 66 is a processing unit that manages virtual machines VM (VM 11, VM 12, . . . ) (refer to FIG. 4) inside the server 50 (within the own device). The virtual machines VM (VM 11, VM 12, . . . ) are external virtual machines or the like as viewed from the MFP 10, and thus, also referred to as external virtual machines (or external virtual server resources) as described above.

The server hosting service management unit 65 manages execution operation of the service in cooperation with the virtual machine management unit 26 (refer to FIGS. 2 and 4) of the server 50 (own device) and the external server management unit 24 (refer to FIGS. 2 and 3) of the MFP 10. The server hosting service management unit 65 also manages processing (reserving processing) of reserving external resources (external virtual server resource, etc.) (also referred to as a substitute device) for executing the operation target service received by the MFP 10, processing (release processing) of releasing the reserved external resource (substitute device), or the like, in cooperation with the external server management unit 24, the virtual machine management unit 66, or the like.

Note that the external server 50 (more specifically, the virtual machine VM or the like in the external server 50) reserved as a substitute device (substitute server) of the MFP 10 with respect to a certain service provides the corresponding service without interposing the MFP 10. Specifically, the substitute device directly receives an execution request of the service from the client 70 (external application) without interposing the MFP 10, and executes the service in response to the execution request. In addition, the substitute device transmits a processing result of the service to the client 70 (external application) as necessary.

Alternatively, in a case where part of the service request detection function that is operable (maintained) even in the power saving mode of the MFP 10 includes a request transfer function to the external server (in other words, in a case where a request is transferred to an allocated external server by using a transfer processing unit or the like in which power supply is maintained even in the power saving mode), it is also allowable that when the MFP 10 has received an execution request of a service from the client 70, the MFP 10 (transfer processing unit or the like) transfers the service to the transfer destination device (substitute device). Furthermore, it is also allowable that the MFP 10 (transfer processing unit or the like) receives a processing result of the service obtained by the transfer destination device of the service from the transfer destination device and transfers the processing result to the client 70.

1-4. Configuration of Client Computer

The client computer 70 is constituted by an information processing apparatus such as a personal computer. The client computer 70 has the same physical configuration as that of the server computer 50, and includes a communication unit, an operation unit, a storage unit, and a controller (including a CPU and a semiconductor memory).

The controller of the client (client computer) 70 executes predetermined programs in the CPU to implement various types of processing.

Specifically, a plurality of application programs (hereinafter also simply referred to as applications) is installed in the client 70. More specifically, applications AP 1, AP 2, and AP 3 for transmitting execution requests of substitute execution viable services SB (services S1, S2, S3, and the like) to be described below are installed in the client 70. Each of the applications AP 1, AP 2, and AP 3 executes processing of transmitting an execution request (execution command) of each of corresponding services (S1, S2, S3, and the like) to the MFP 10. The client 70 is a device that requests a service from the MFP 10, and thus, also referred to as a service requesting device or the like. It is also possible for one application to transmit execution requests of a plurality of services to the MFP 10.

As described above, upon receiving the execution request of the service, the MFP 10 determines the apparatus to execute the service. Specifically, the MFP 10 determines whether the service is to be executed by the MFP 10 itself or processed by substitute execution by an external resource (such as the external server 50) of the MFP 10. In addition, the MFP 10 also executes operation of reserving the external server 50 on the basis of the determination result.

1-5. Service Classification

The plurality of services (S0, S1, S2, S3, . . . ) executed in the present system is divided by rough classification into two services SA and SB as below from the viewpoint of whether or not the service can be processed by substitute execution by the external resources of the MFP 10.

The service SA (substitute execution unviable service) is a service that can be executed by the MFP 10 alone among the MFP 10 and external resources (such as the external server 50) and thus is not executable by substitute execution by external resources. In short, the service SA is a service that can be executed only by the MFP 10. While the service SA can be executed by the MFP 10, the service SA is a service that is not executable by substitute execution by the external resource, and is also referred to as a substitute execution unviable service (or a substitute unviable service). Note that the substitute execution unviable service SA is always executed by the MFP 10, and thus, the MFP 10 cannot transition to the power saving mode while the substitute execution unviable service SA is in operation.

For example, an image processing service or the like using the hardware of the MFP 10 (the print output unit, the image reading unit, the facsimile transmission unit, the box (storage unit), etc.) that has received the service corresponds to the substitute execution unviable service SA. More specifically, the substitute execution unviable service SA includes a copy job function providing service S0 using the operation unit of the MFP, as an example. The service S0 is a service that can be provided by the MFP 10 in response to a request from an application (copy job operation application) installed inside the MFP 10, not in response to a request from an external application.

In contrast, the service SB (substitute execution viable service) is a service that can be executed by an external resource (such as the external server 50) in place of the MFP 10. In other words, the service SB is a service that can be executed by the MFP and can also be executed by external resources. The service SB is a service that can be processed by substitute execution by external resources, and thus is also referred to as a substitute execution viable service (also referred to as a substitute viable service). In a case where the substitute execution viable service SB is processed by substitute execution by an external resource, there is a possibility that the MFP 10 transitions to the power saving mode even when the substitute execution viable service SB is in operation (during substitute execution by an external resource).

Examples of the service SB (substitute viable service) include a device information acquisition service S1, a document processing service S2, a user management service S3, or the like.

The device information acquisition service S1 is a device information acquisition service of the MFP 10 (image processing apparatus). The device information acquisition service S1 is a service executed on the MFP 10 side in response to a request from the device information acquisition application AP 1 (refer to FIG. 4) installed in the client 70. The device information acquisition application AP 1 (external application) is an application that periodically collects device information (counter information, etc.) from one or more MFPs 10. For example, each of MFPs 10 having received the execution request of the service (device information acquisition service S1) from the device information acquisition application AP 1 obtains device information stored in its own device (MFP 10) and provides a service to the effect that a reply with the device information is given to the client apparatus 70. This enables the device information acquisition application AP 1 to periodically collect device information (counter information or the like) from one or more MFPs 10.

The document processing service S2 is a service that executes predetermined document processing. An example of document processing includes translation processing. The document processing service S2 is a service executed on the MFP 10 side in response to a request from the document processing application AP 2 (refer to FIG. 4) installed in the client 70. For example, the document processing application AP 2 (external application) is an application that causes the MFP 10 to execute predetermined document processing (translation processing or the like) at a predetermined time. For example, the document processing application AP 2 transmits an execution request for translation processing of a certain document (daily report, etc.) to the MFP at a fixed time (e.g., 14:00) every day. The MFP 10 having received the execution request (for example, the execution request of the translation processing) of the service (document processing service S2) from the document processing application AP 2 executes the translation processing in response to the request, and replies with a result of the translation processing (translated document) to the client 70. This processing enables the document processing application AP 2 to cause the MFP 10 to execute predetermined document processing (translation processing, etc.) at a predetermined time.

The user management service S3 is a service that manages user's use information (more particularly, that obtains and transmits user's use information). The user management service S3 is a service executed on the MFP 10 side in response to a request from the user management application AP 3 (refer to FIG. 4) installed in the client 70. The user management application AP 3 (external application) is an application that periodically (for example, once a day (time zone before work start time) (time zone from 6:00 to 8:00)) receives user's use information from one or more MFPs 10 so as to manage use information of the user. The user management application AP 3 periodically transmits to the MFP 10 a transmission request for use information of a plurality of users of the MFP 10. The MFP 10 having received the execution request (transmission request of the use information of each of users) of the service (user management service S3) from the user management application executes the acquisition processing of use information of each of the users in response to the request, and replies with a result of the acquisition processing (use information of each of the users) to the client 70.

Here, the service SB (S1, S2, S3) can be executed by the MFP 10 itself while being executable (substitute execution) by an external device (external resource) other than the MFP 10. In a case where the service is executed by the external resource, the MFP 10 transmits various types of information to be used in the service beforehand (before transition to the power saving mode (also referred to as before the sleep transition)), to the external resource (external server 50 or the like). For example, regarding the service S1, device information (counter information or the like) of the MFP 10 only has to be transmitted from the MFP 10 to the external resource just before sleep transition. Regarding the service S2, target document data of document processing (translation processing, etc.) only has to be transmitted from the MFP 10 to the external resource just before sleep transition. Similarly, regarding the service S3, each of pieces of user information (use information of each of the users, etc.) stored in the MFP 10 only has to be transmitted from the MFP 10 to the external resource just before sleep transition.

As described above, a plurality of services (S0, S1, S2, S3, . . . ) executable in the present system can include the substitute execution viable service SB and the substitute execution unviable service SA.

In a case where neither of these services SA and SB is executed by the MFP 10, the MFP 10 is able to transition to the power saving mode.

Note that the above services S1, S2, and S3 (SB) are also expressed as services provided in response to a request from an external application (application installed in an external device (client 70) of the MFP 10). In contrast, the above service S0 (SA) is also expressed as a service provided in response to a request from an internal application (application installed inside the MFP 10). Each of the services SA and SB, however, might be provided in response to a request from an external application, or be provided in response to a request from an internal application, in some cases.

1-6. Service Operation History Information

FIG. 5 is a diagram illustrating an example of service operation history information regarding each of a plurality of services. In the service operation history information 210 of FIG. 5, an operation status (operation history) of the past (here, the previous day) related to each of the plurality of services S0, S1, S2, and S3 is recorded for each of time zones (here, each of time zones in units of two hours (for each of time zones in predetermined units)).

In an embodiment of the present invention, the "operation" state of a service (a service received by the MFP 10 in response to a request from the client 70) can include a mode in which the (actual) execution subject (execution device) of the service is the MFP 10 itself and a mode in which the execution subject is a substitute device (also referred to as a substitute execution device) of the MFP 10.

The service operation history information 210 distinctively illustrates an operation status in each of time zones of each of services regardless of an (actual) execution device of each of the services. More specifically, the operation status of each of services in each of time zones is distinctively illustrated regardless of whether each of the services was operated in the MFP 10 or operated by a resource (external resource) other than the MFP 10.

Here, judgment to the effect that a certain service was operating in a certain time zone in the past is made in a case where the certain service was operating with a predetermined ratio or more (for example, 50%) in the certain time zone in the past. The time zone on which such a judgment was made is also referred to as an "operation time zone" of the certain service and is indicated by cross hatching in FIG. 5. The operation time zone is also expressed as a time zone in which the ratio of the operation time of the service in the operation history is a predetermined value or more.

In FIG. 5, cross hatching is added to the fields of the period from 8:00 (8 am) to 18:00 (6 pm) related to the service S0 (substitute execution unviable service (substitution unviable service) SA). The cross hatching added to the fields of the relevant period related to the service S0 (period from 8:00 to 18:00) indicates that this period is an operation time zone TA of the service S0 (substitute unviable service SA).

In addition, in FIG. 5, operation periods of the substitute execution viable service (substitute viable service) SB is also illustrated. Specifically, each of operation periods is illustrated for each of the three services S1, S2, and S3 (each of substitute viable services). In FIG. 5, cross hatching is added to each of "operation time zones" of each of the services S1, S2, and S3. In detail, the figure indicates that the operation time zone of the service S1 corresponds to all the time zones (period from 0:00 to 24:00). In addition, the figure illustrates that the operation time zone of the service S2 corresponds to "the period from 14:00 to 18:00" and that the operation time zone of the service S3 corresponds to "the period from 6:00 to 8:00."

While the service operation status of the previous day is illustrated as the service operation history information 210, the present invention is not limited to this. For example, the service operation history information 210 may be a service operation status of another specific day in the past (for example, the same day of the week of the previous week (Tuesday of last week, etc.)). Alternatively, the service operation history information 210 may be the one in which the operation status related to a plurality of past days (for example, one month) has been totaled (averaged, etc.) for each of time zones.

Each of the time zones need not be in units of two hours, and may be in units of another predetermined time (for example, one hour, three hours, 30 minutes, etc.).

1-7. Outline of Operation

In the MFP 10, an execution device of the operation target service is determined in accordance with whether the "operation target service" (operation target service at a certain time point (at a current time point, etc.)) is the substitute execution unviable service SA or the substitute execution viable service SB.

In a case where the "operation target service" is the substitute execution unviable service SA, a determination is made to the effect that the operation target service is to be always executed by the MFP 10 (refer to FIG. 9). FIG. 9 indicates that the execution device of the service S0 is the MFP 10 in all time zones in a case where the operation target service is the service S0 (substitute execution unviable service SA). In other words, the service S0 is executed by the MFP 10 itself regardless of any of the time zones the service S0 is to be operating in.

In another case where the "operation target service" is the substitute execution viable service SB, a determination is made to the effect that the operation target service is to be always executed by the MFP 10 when there is the substitute execution unviable service SA as another operation target service.

More specifically, the execution device of the operation target service is determined on the basis of whether or not the substitute execution unviable service SA is included in all the operation target services (refer to steps SP12, SP13, and SP22 in FIG. 7 (described below)). In particular, in a case where there is a plurality of services as "operation target services" to be operated at a certain time point, determination is made to the effect that each of the plurality of services is to be executed by the MFP 10 when the plurality of services (operation target services) includes the substitute execution unviable service SA.

In contrast, when there is no substitute execution unviable service SA as another operation target service in a case where the "operation target service" is the substitute execution viable service SB, an execution device of the operation target service is determined on the basis of the service operation history information 210 (refer to FIG. 5). In other words, in a case where there is a plurality of services as "operation target services" to be operated at a certain time point, and in a case where the plurality of services ("operation target services") includes the substitute execution viable service SB alone without including the substitute execution unviable service SA, the execution device of the operation target service is determined by simplified operation as described below.

FIG. 6 illustrates an example of the determination result of the execution device of each of services (substitute execution viable service SB) for each of time zones. FIG. 6 illustrates each of the substitute execution viable services S1, S2, and S3 is to be executed by which of the execution devices for each of time zones on the assumption that the substitute execution unviable service SA is not included in all the operation target services.

In FIG. 6, hatching (specifically, diagonal hatching or sandy hatching) is added to the time zone fields corresponding to the execution device of each of services. More specifically, diagonal hatching is added to the time zone fields to which the MFP 10 is determined to be assigned as the service execution apparatus, while sandy hatching is added to the time zone fields to which the external resource (external server 50) is determined to be assigned as the service execution device. In this manner, FIG. 6 collectively illustrates execution devices for each of time zones of the plurality of services.

Moreover, each of FIGS. 10 to 12 illustrates execution devices of each of the services for each of the time zones. FIG. 10 illustrates execution devices of the service S1 for each of time zones, FIG. 11 illustrates execution devices of the service S2 for each of time zones, and FIG. 12 illustrates execution devices of the service S3 for each of time zones.

Figure 13:
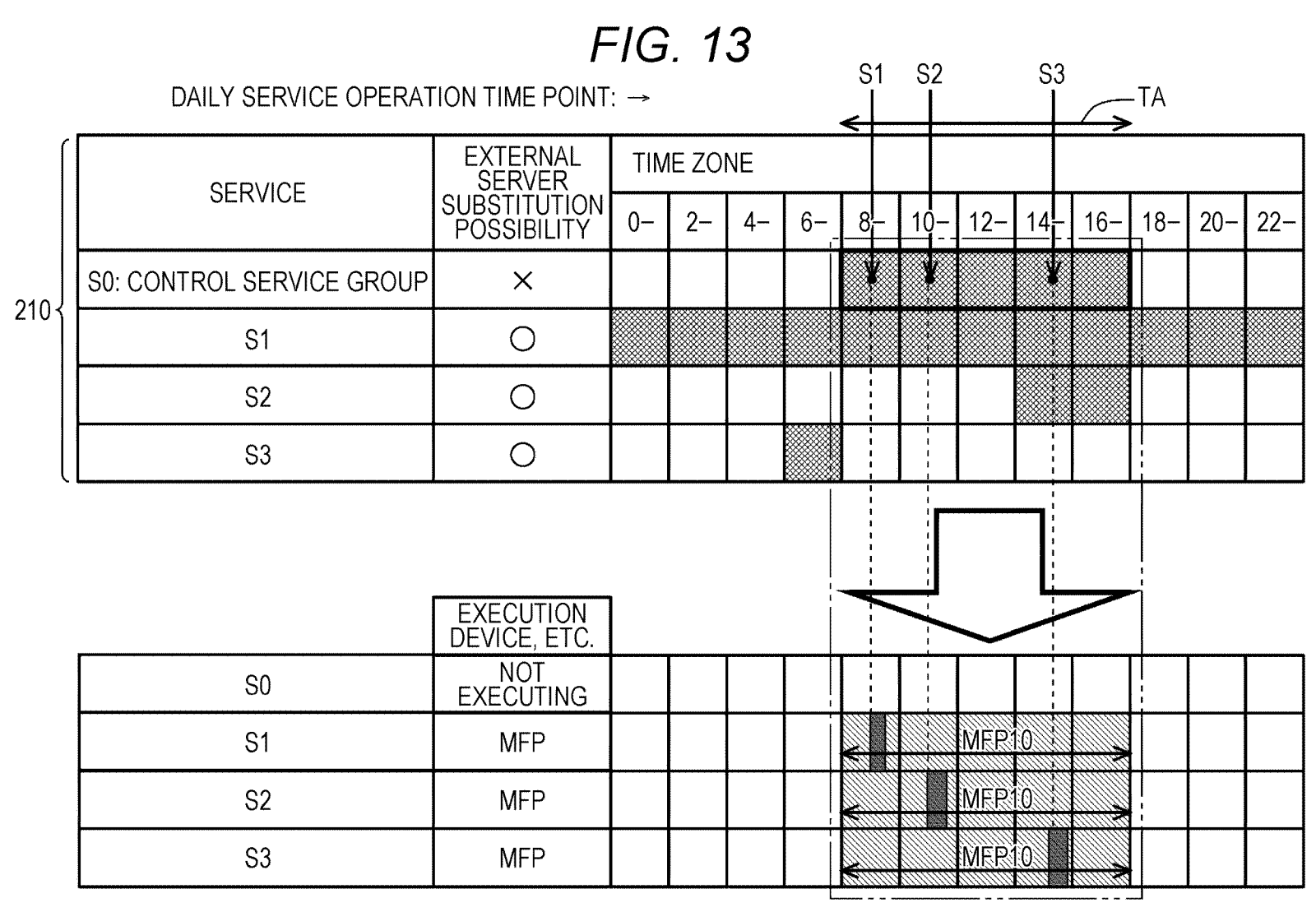
Figure 14:
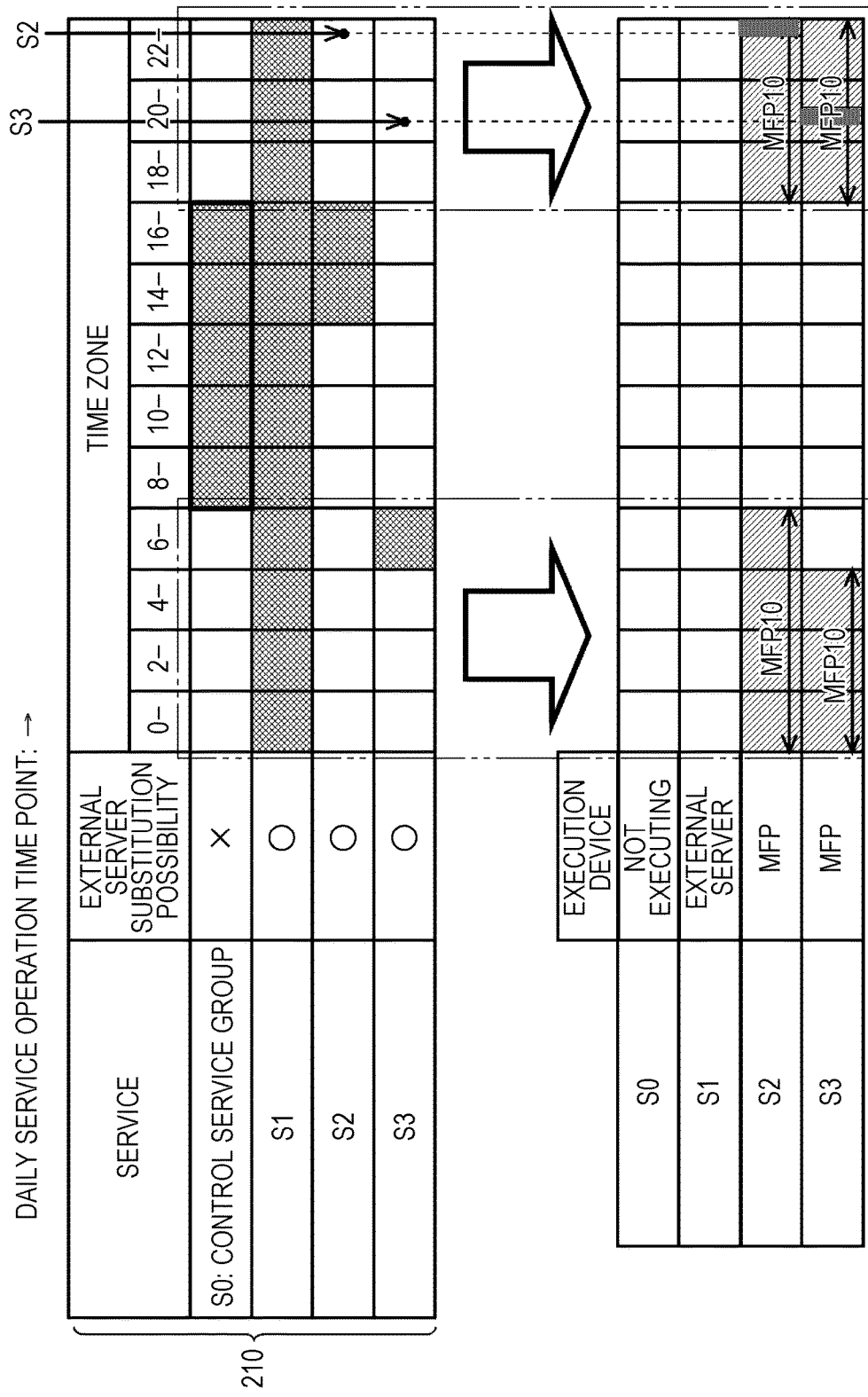
FIG. 14 is a diagram illustrating that a substitute execution viable service is going to be executed by an MFP when the operation time point of the substitute execution viable service does not belong to the operation time zone in the operation history of the substitute execution viable service in a case where the substitute execution viable service is executed in a time zone other than the operation time zone of the substitute execution unviable service.

In addition, FIG. 13 illustrates that, in a case where a certain time belongs to the time zone TA, each of the substitute execution viable services S1, S2, and S3 is executed by the MFP 10 (described below). FIG. 14 illustrates that, in a case where a certain time does not belong to the time zone TA and does not belong to the operation time zone in the operation history of each of the substitute execution viable services S1, S2, and S3, each of the substitute execution viable services S1, S2, and S3 is executed by the MFP 10 (described below). FIG. 15 illustrates that, in a case where a certain time does not belong to the time zone TA and belongs to the operation time zone in the operation history of each of the substitute execution viable services S1, S2, and S3, each of the substitute execution viable services S1, S2, and S3 is executed by the external resource (described below).

Note that also in FIGS. 10 to 15, it is assumed that the substitute execution unviable service SA is not included in any of the operation target services.

As described above, when there is no substitute execution unviable service SA as another operation target service in a case where the "operation target service" is the substitute execution viable service SB (refer to FIGS. 10 to 12), an execution device of the operation target service is determined on the basis of the service operation history information 210.

Specifically, in a case where the "operation target service" is the substitute execution viable service SB, a determination is made to the effect that the operation target service is to be processed by substitute execution by the external resource (such as the external device 50 of the MFP 10) on the condition that a judgment is made to the effect that a time point of interest (a certain time point at which the substitute execution viable service SB is to be operated) (in other words, a specific time zone in the past corresponding to the time point of interest) does not belong to the "time zone TA" (operation time zone of the substitute execution unviable service SA in the operation history), on the bases of the service operation history information 210.

More specifically, firstly in a case where the "operation target service" is the substitute execution viable service SB as illustrated in FIG. 13, and when a judgment is made to the effect that the time point of interest (the current time point) belongs to the time zone TA (in other words, the time zone same as the time zone TA) on the basis of the service operation history information 210, then, a determination is made to the effect that the operation target service is to be executed by the MFP 10. The time zone TA (also refer to FIG. 5) is presumed to be a time zone during which it is difficult to maintain the sleep state in the MFP 10 due to the fact that the substitute execution unviable service SA (service executable only in the MFP 10) is in operation in this time zone TA. Accordingly, a determination is made to the effect that the operation target service is to be executed by the MFP 10.

For example, as illustrated in FIGS. 12 and 13, in a case where the service S3 (substitute execution viable service SB) is received at 15:00 on a certain day, the MFP 10 refers to the service operation history information 210 (FIG. 5) to judge that the current time point (15:00) belongs to the time zone TA. In other words, the MFP 10 judges that the past time zone (the period from 14:00 to 16:00) corresponding to the current time point (15:00) belongs to the time zone TA. On this condition, the MFP 10 determines that the operation target service S3 is to be executed by the MFP 10 itself. In a case where the service S3 is received at another time within the time zone TA, a determination is made to the effect that the service S3 is to be executed by the MFP 10 itself in a similar manner. The similar applies to the other services S1 and S2. That is, in a case where the service S1 (and/or S2) is received at the time within the time zone TA, a determination is made to the effect that the service S1 (and/or S2) is to be executed by the MFP 10 itself in a similar manner (refer to also FIGS. 10, 11, and 13). In this manner, in a case where each of services S1, S2, and S3 is received within the time zone TA, a determination is made to the effect that each of the services S1, S2, and S3 is to be executed by the MFP 10 itself (refer to FIG. 13 in particular).

Executing the substitute execution viable service SB by an external resource in the time zone TA would generate use cost (usage fee) of the external resource. In that case, the use cost of the external resource would be generated even though the MFP 10 is difficult to transition to the sleep state within the time zone TA.

To cope with this, the present embodiment is configured as illustrated in FIG. 6, such that, in a case where the operation target service is the substitute execution viable service SB alone and in a case where the current time point belongs to the time zone TA (operation time zone of the substitute execution unviable service SA in the service operation history information 210), each of the substitute execution viable services SB is going to be executed by the MFP 10. With this configuration, there is no need to use an external resource (external server, etc), making it possible to avoid or suppress generation of the use cost of the external resource.

Meanwhile, in a case where a judgment is made to the effect that the current time point does not belong to the time zone TA on the basis of the service operation history information 210, then, a determination is made to the effect that, in principle, the operation target service is to be processed by substitute execution by an external resource (such as the external device 50 of the MFP 10). Here, the time zones other than the time zone TA are considered to be time zones in which maintenance of the sleep state in the MFP 10 is comparatively easy due to the fact that the substitute execution unviable service SA is not in operation. Accordingly, in principle, a determination is made to the effect that the operation target service is to be executed by an external resource, in this case.

Still, in the present embodiment, in a case where the operation target service is the substitute execution viable service SB, the MFP 10 makes a determination to the effect that the operation target service is to be processed by substitute execution by an external resource on additional condition that judgment is made to the effect that the operation target service was in operation in a specific time zone in the past corresponding to the current time on the basis of the service operation history information 210. In other words, a determination is made to the effect that the substitute execution viable service SB (S3, etc.) is to be processed by substitute execution by an external resource (refer to also FIG. 15) also on the condition that the current time point belongs to the operation time zone TB (TB3, for example) (from 6 am to 8 am in FIG. 5) of the substitute execution viable service SB (S3, for example).

For example, as illustrated in FIG. 15 (and FIG. 12), in a case where the service S3 (substitute execution viable service SB) is received at 6:30 am on a certain day, the MFP 10 refers to the service operation history information 210 and makes a judgment to the effect that the time zone corresponding to the current time point (corresponding time zone in the past) (period from 6 am to 8 am) does not belong to the operation time zone TA. Furthermore, the MFP 10 refers to the service operation history information 210 and makes a determination to the effect that the operation target service is to be processed by substitute execution by an external resource on another condition that a judgment is made to the effect that the operation target service was operating (refer to FIG. 5) with a predetermined ratio (for example, 50%) or more out of the corresponding time zone (period from 6 am to 8 am) in the past on the basis of the service operation history information 210. In other words, the MFP 10 makes a determination to the effect that the operation target service is to be processed by substitute execution by an external resource also on the condition that a judgment is made to the effect that the corresponding time zone in the past is the operation time zone of the operation target service (refer to FIG. 5) on the basis of the service operation history information 210. More specifically, the MFP 10 determines that the operation target service S3 is to be executed by an external resource (server 50 (50a, etc.)), rather than by the MFP 10 itself.

In this manner, in a case where the current time point does not belong to the time zone TA, and when the current time point belongs to the operation time zone TB3 (operation time zone TB3 of the service S3 in the service operation history information 210) of the received service S3 (substitute execution viable service SB) (refer to FIG. 5), a determination is made to the effect that the operation target service S3 is to be executed by an external resource (server 50 (50a, etc.)) (also refer to FIG. 15) rather than by the MFP 10 itself.

In a case where a judgment is made to the effect that the time zone corresponding to the current time point belongs to the operation time zone TB3 of the service S3, it is highly likely that the service S3 is to be executed over a predetermined period or more even in the same time zone (current time zone) of the current date. Accordingly in this case, a determination is made to the effect that the service S3 is to be executed by an external resource (server 50 (50a, etc.)) as described above. When all the services are going to be processed by substitute execution by an external resource, the MFP 10 can transition to the power saving mode more easily.

The similar applies to other services. For example, in a case where the service S1 is received at a certain time point (18:30) other than the time zone TA and the past time zone corresponding to the certain time point belongs to the operation time zone TB1 (refer to FIG. 5) of the service S1, a determination is made to the effect that the service S1 is to be executed by the external resource (external server 50) (refer to FIG. 15).

In contrast, in a case where the operation target service is received at a certain time other than the time zone TA and the past time zone corresponding to the certain time point does not belong to the operation time zone of the operation target service, a determination is made to the effect that the operation target service is to be executed by the MFP 10 itself (refer to FIG. 14).

For example, as illustrated in FIG. 14 (and FIG. 12), in a case where the service S3 (substitute execution viable service SB) is received at 20:30 (8:30 pm) on a certain day, the MFP 10 makes a judgment to the effect that the operation target service (substitute execution viable service SB) was not in operation in a specific time zone in the past (the period from 20:00 to 22:00) corresponding to the current time (20:30) (refer to FIG. 5) on the basis of the service operation history information 210. At this time, the MFP 10 makes a determination to the effect that the operation target service (S3) is to be processed by substitute execution by the MFP 10 itself (rather than by an external resource).

In the case where the service S3 has been received at a certain time other than the time zone TA and the past time zone corresponding to the certain time point does not belong to the operation time zone TB3 of the service S3, a determination is made to the effect that the service S3 is to be executed by the MFP 10 itself (refer to FIG. 14).

In a case where judgment is made to the effect that the time zone corresponding to the current time point does not belong to the operation time zone TB3 of the service S3, then, a judgment is made to the effect that it is not necessarily likely that the service S3 occurring at the current time be going to be executed over a predetermined period or more. For example, since such a service S3 that has occurred up to the current time point does not have an operation record in the same time zone in the past, it is considered to be comparatively highly possible that the service occurred sporadically or terminated in a short time. Alternatively, it is unknown, for at least a service not having an operation record in the same time zone in the past, whether the service will be finished soon or continued for a long time. Constantly reserving an external resource for the execution of such services would lead to a high risk of wasteful costs. For example, in a case where an external resource (such as an external server) has a charging system of charging in a predetermined time unit (for example, the unit of hour), there would be a case of being charged for the use cost of one hour (60 minutes) (as usage fee) even though the actual use time was only one minute or so.

To handle this problem in such a situation, the present embodiment is configured such that the service S3 is to going to be executed by the MFP 10 not by substitute execution by an external resource. With this configuration, it is possible to avoid or suppress the generation of unnecessary costs.

The similar applies to other services. For example, in a case where the service S2 has been received at a certain time other than the time zone TA and the past time zone corresponding to the certain time point is not the operation time zone TB2 of the service S2, a determination is made to the effect that the service S2 is to be executed by the MFP 10 itself (refer to FIG. 14).

FIG. 6 collectively illustrates the execution devices determined as described above.

As illustrated in FIG. 6, the substitute execution viable services S1 and S3 are executed by an external resource in a part of the time zone alone. Specifically, the service S1 is executed by an external resource only in the time zone "0:00 to 8:00" and "18:00 to 24:00", and executed by the MFP 10 in the other time zones. The service S3 is executed by an external resource in the time zone "6:00 to 8:00" alone, and executed by the MFP 10 in the other time zones. In addition, the substitute execution viable service S2 is executed by the MFP 10 in all time zones and is not executed by external resources in any of the time zones.

Hereinafter, such operation will be described in detail.

1-8. Operation in Normal Mode

As described above, the MFP 10 has two operation modes (specifically, "normal mode" and "power saving mode") in rough classification.

First, operation of the MFP 10 in the normal mode (non-sleeping state) will be described with reference to FIG. 7. FIG. 7 is a flowchart illustrating operation of the MFP 10 in the normal mode.

The MFP 10 periodically obtains the operation status of each of services (at intervals of a fixed period (for example, at intervals of several seconds to several tens of seconds) or the like) (step SP11).

Next, in step SP12, it is judged whether or not there is a service to be operated at the current time point (including a service in operation and/or a service immediately after reception), and then, branch processing is performed on the basis of the judgment result. In a case where there is no service to be operated at the current time point (also referred to as operation target service), the mode transitions to the power saving mode (step SP18). Operation (refer to FIG. 8) after the transition to the power saving mode will be described below.

In contrast, in a case where there is an operation target service at the current time point, it is further judged whether or not the operation target service includes the substitute execution unviable service SA, and the processing proceeds to branch processing of step SP13.

In a case where one or more operation target services include the substitute execution unviable service SA, a determination is made to the effect that all of the operation target services are to be executed by the MFP 10, and the processing proceeds from step SP13 to step SP22. In step SP22, the normal mode is maintained, and the MFP 10 by oneself executes the operation target service (the substitute execution unviable service SA alone or both the substitute execution viable service SA and the substitute execution viable service SB).

For example, in a case where both the substitute execution unviable service SA and the substitute execution viable service SB are included in two or more services to be operated at the current time point as an operation target service, a determination is made to the effect that not merely the substitute execution unviable service SA but also substitute execution viable service SB is to be executed by the MFP 10. In other words, in a case where there is a plurality of operation target services as the service to be operated at the current time point (in a case where there is a plurality of operation target services including one operation target service) and in a case where any of the plurality of operation target services is the substitute execution unviable service SA, a determination is made to the effect that each of the plurality of operation target services is to be executed by the MFP 10. With this configuration, in a situation where the MFP 10 does not transition to the sleep state due to the execution of the substitute execution unviable service SA (executed by the MFP 10), not merely the substitute execution unviable service SA but also the substitute execution viable service SB is executed by using the MFP 10 and thus, there is no need to use external resources. This makes it possible to suppress the use cost of external resources.

Note that a determination is made to the effect that the substitute execution unviable service SA is to be always be executed by the MFP 10 (refer to FIG. 9). FIG. 9 indicates that the execution device of the service S0 is the MFP 10 in all time zones in a case where the operation target service is the service S0 (substitute execution unviable service SA).

In contrast, in a case where the substitute execution unviable service SA is not included in the operation target service (in other words, in a case where all the operation target services are substitute execution viable services SB), the processing proceeds from step SP13 to step SP14.

In step SP14, the MFP 10 obtains the service operation history information 210.

In the next step SP15, it is judged whether or not the current time (also expressed as the time at which the operation target service is to be executed) belongs to the operation time zone TA of the substitute execution unviable service SA in the service operation history information 210.

In a case where it is judged that the current time belongs to the operation time zone TA of the substitute execution unviable service SA, a determination is made to the effect that all of the operation target services (substitute execution viable services SB) are to be executed by the MFP 10, and the processing proceeds from step SP15 to step SP22. In step SP22, the normal mode is maintained, and the MFP 10 executes the operation target service (substitute execution viable service SB) by the MFP 10 itself.

In contrast, in a case where it is judged that the current time does not belong to the operation time zone TA of the substitute execution unviable service SA, the processing proceeds from step SP15 to step SP16.

In step SP16, the MFP 10 executes branch processing corresponding to whether or not judgment is made to the effect that the operation target service has been in operation (a predetermined ratio or more) in the corresponding time zone in the past in the service operation history information 210. The branch processing is also expressed as branch processing depending on whether or not the judgment is made to the effect that the current time belongs to the operation time zone of the operation target service in the operation history.

In a case where a judgment is made to the effect that the operation target service has not been operated (not to reach the predetermined ratio) in the corresponding time zone in the past in the service operation history information 210, a determination is made to the effect that the operation target service is to be executed by the MFP 10 (step SP18) and the processing proceeds to step SP22. In step SP22, the normal mode is maintained, and the MFP 10 executes the operation target service (substitute execution viable service SB) by the MFP 10 itself.

In contrast, in a case where a judgment is made to the effect that the operation target service has been in operation (a predetermined ratio or more) in the corresponding time zone in the past in the service operation history information 210, the processing proceeds from step SP16 to step SP17.

In step SP17, a determination is made to the effect that the operation target service is to be processed by substitute execution by an external resource. Subsequently, the MFP 10 reserves an external server that performs substitute execution of the substitute execution viable service SB and causes the external server to execute the substitute execution viable service SB. When the execution subject of the substitute execution viable service SB is changed from the MFP 10 to the external server 50 (external resource), the data (also referred to as virtual server data) used in the substitute execution viable service SB or the like is relayed from the device before change (MFP 10) to the device after change (external server 50). Specifically, as described above, the data or the like is transmitted from the device before change (MFP 10) to the device after change (external server 50) immediately before the transition of the MFP 10 to sleep. The data or the like is stored in the device after the change, so as to be used by the device after the change.

In the next step SP18, the MFP 10 transitions to the power saving mode on its own. Thereafter, the operation in FIG. 8 (described below) is executed.

As described above, a determination is made to the effect that the operation target service to be operated at a certain time point is to be processed by substitute execution by an external resource (refer to step SP18) on condition that a certain time point (current time point) does not belong to the operation time zone TA of the substitute execution unviable service SA (refer to step SP15). In other words, when a certain time point belongs to the operation time zone TA of the substitute execution unviable service SA, a determination is made to the effect that the operation target service is to be executed by the MFP 10 (refer to step SP22). With this processing, the operation target service can be processed by substitute execution on the external resource, enabling the MFP 10 to easily shift to the power saving mode, making it possible to achieve power saving of the MFP 10. In addition, in a case where the certain time point belongs to the operation time zone TA of the substitute execution unviable service SA, the operation target service is not going to be executed by the external resource. This suppresses the use time of the external resource, making it possible to suppress the use cost of the external resource.

Moreover, a determination is made (refer to step SP17) to the effect that an operation target service is to be processed by substitute execution by an external resource on condition that a judgment is made to the effect that the operation target service has been operating in a specific time zone in the past corresponding to a certain time point (step SP16). In other words, in a case where a judgment is made to the effect that the operation target service has not been operating in a specific time zone, a determination is made to the effect that the operation target service is to be executed by the MFP 10 (refer to step SP22). This makes it is possible to further suppress the use time of external resources.

Moreover, a determination is made (refer to step SP22) to the effect that each of a plurality of operation target services is to be executed on the MFP 10 in a case where any of the plurality of operation target services is a substitute execution unviable service (YES in SP13), making it possible to further suppress the use time of external resources.

Note that in a case where two or more substitute execution viable services SB exist as operation target services, step SP16 proceeds to step SP17 on condition that, for example, both of the two or more substitute execution viable services SB are operating in the corresponding time zone in the service operation history information 210. In step SP17, an execution device of each of the substitute execution viable services SB is only be required to be individually determined. Furthermore, here, it is assumed that external resources (external server 50, etc.) that performs substitute execution of each of the substitute execution viable services SB can be reserved for all substitute execution viable services SB as operation targets. However, the present invention is not limited to this, and the operation or the like of the second embodiment to be described below may be performed.

1-9. Operation in Power Saving Mode

Figure 8:
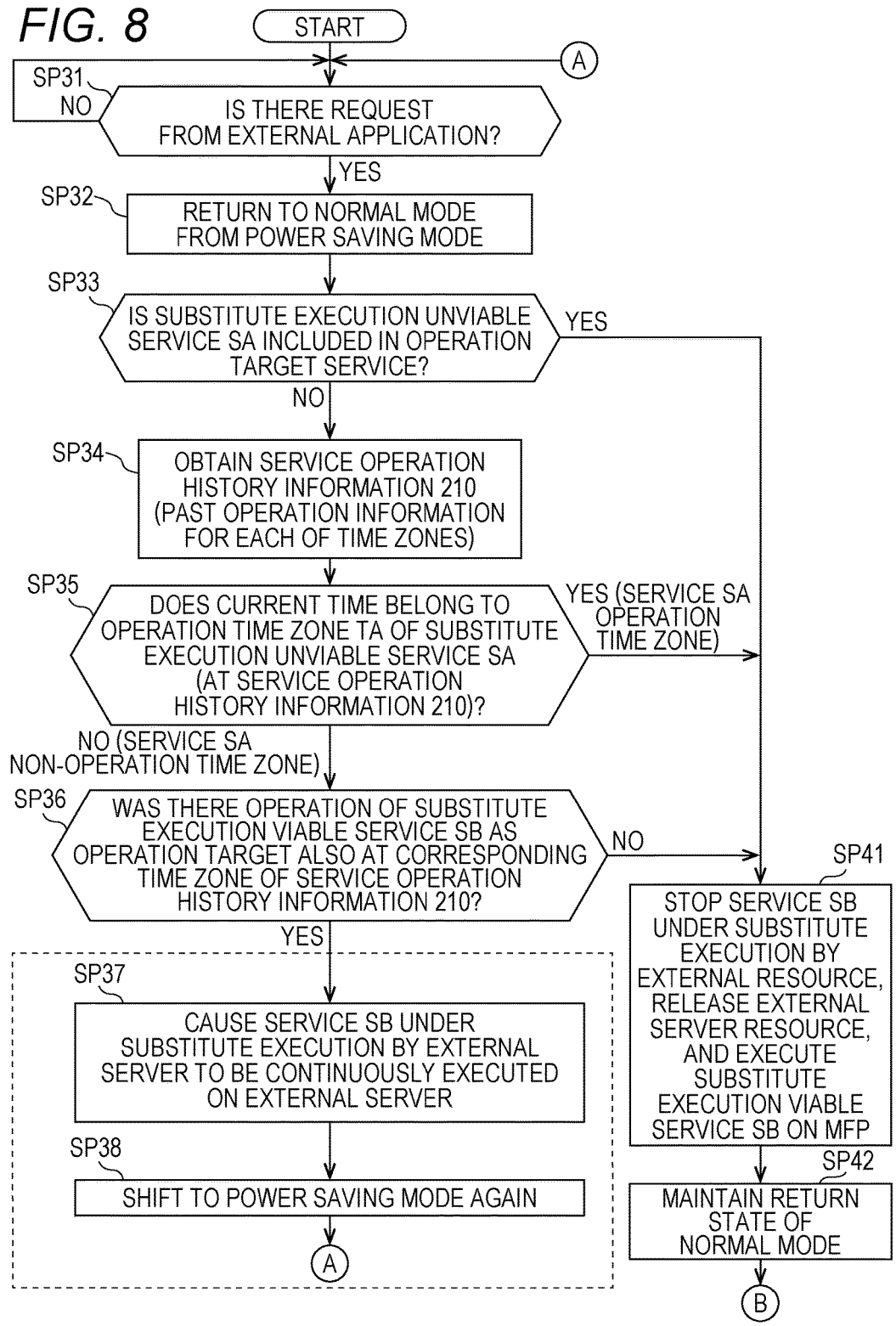
FIG. 8 is a flowchart illustrating operation or the like of an MFP having a power saving mode.

Next, operation or the like of the MFP 10 in the power saving mode will be described with reference to FIG. 8. FIG. 8 is a flowchart illustrating operation (and operation immediately after returning from the power saving mode) of the MFP 10 having the power saving mode.

When a request from an external application (a request from the client 70) has been received in step SP31, the MFP 10 returns from the power saving mode to the normal mode (step SP32).

Thereafter, the MFP 10 determines whether each of services to be operated at the time point of returning is to be executed by the MFP 10 itself or to be executed by an external resource in place of the MFP 10.

Specifically, firstly, in step SP33, it is judged whether or not the substitute execution unviable service SA is included in the operation target service (service being processed by substitute execution and the service newly received in the sleep state (in step SP31)).

In a case where substitute execution unviable service SA is included in the operation target service, the processing proceeds to step SP41. The processing of step SP41 will be described below.

In contrast, in a case where the substitute execution unviable service SA is not included in the operation target service, the processing proceeds to step SP34. In other words, in a case where each of the operation target services is the substitute execution viable service SB, the processing proceeds to step SP34.

In step SP34, the MFP 10 obtains the service operation history information 210 (refer to FIG. 5).

In the next step SP35, it is judged whether or not the current time point (time point of returning to the power saving mode) belongs to the operation time zone TA of the substitute execution unviable service SA in the service operation history information 210.

In a case where it is judged that the time point of returning to the power saving mode belongs to the operation time zone TA of the substitute execution unviable service SA (in the service operation history information 210), the processing proceeds from step SP35 to step SP41.

In step SP41, a determination is made to the effect that all of the operation target services are to be executed by the MFP 10. In addition, when there is a "service under substitute execution" (substitute execution viable service SB in substitute execution by an external resource), a determination is made to the effect that the substitute execution of the service under substitute execution performed by the external resource is to be stopped and that the service under substitute execution is to be executed by the MFP 10. Furthermore, the MFP 10 releases the external resource (more specifically, a specific external device (for example, the server 50c)) processing the service under substitute execution. More specifically, the MFP 10 transmits to the external resource (external server, etc.) a stop command of substitute execution and a command (resource release command) to release resources related to the substitute execution so as to release the external resource (specifically, the specific external device). Subsequently, all of the operation target services (services received in the sleep state (and the service under substitute execution)) are executed by the MFP 10. In addition, the MFP 10 stops re-returning to the power saving mode, and maintains the state of being returned to the normal mode as it is (step SP42). Thereafter, the processing proceeds to step SP11 in FIG. 7.

In contrast, in a case where it is judged that the time point of returning to the power saving mode does not belong to the operation time zone TA of the substitute execution unviable service SA (in the service operation history information 210), the processing proceeds from step SP35 to step SP36.

In step SP36, the MFP 10 judges whether or not the operation target service (the service under substitute execution and/or the service newly received (in step SP31) (new reception service, etc.) in a sleep state) has been operating for a predetermined ratio or more in the corresponding time zone in the past in the service operation history information 210. In other words, it is judged on the basis of the service operation history information 210 whether or not the time point of returning from the power saving mode belongs to the operation time zone of the operation target service (new reception service and/or service under substitute execution) in the operation history.

When it is judged on the basis of the service operation history information 210 that the time point of returning does not belong to the operation time zone of the operation target service in the operation history, the processing proceeds to step SP41. Operation of steps SP41 and SP42 as described above are executed.

Figure 7:
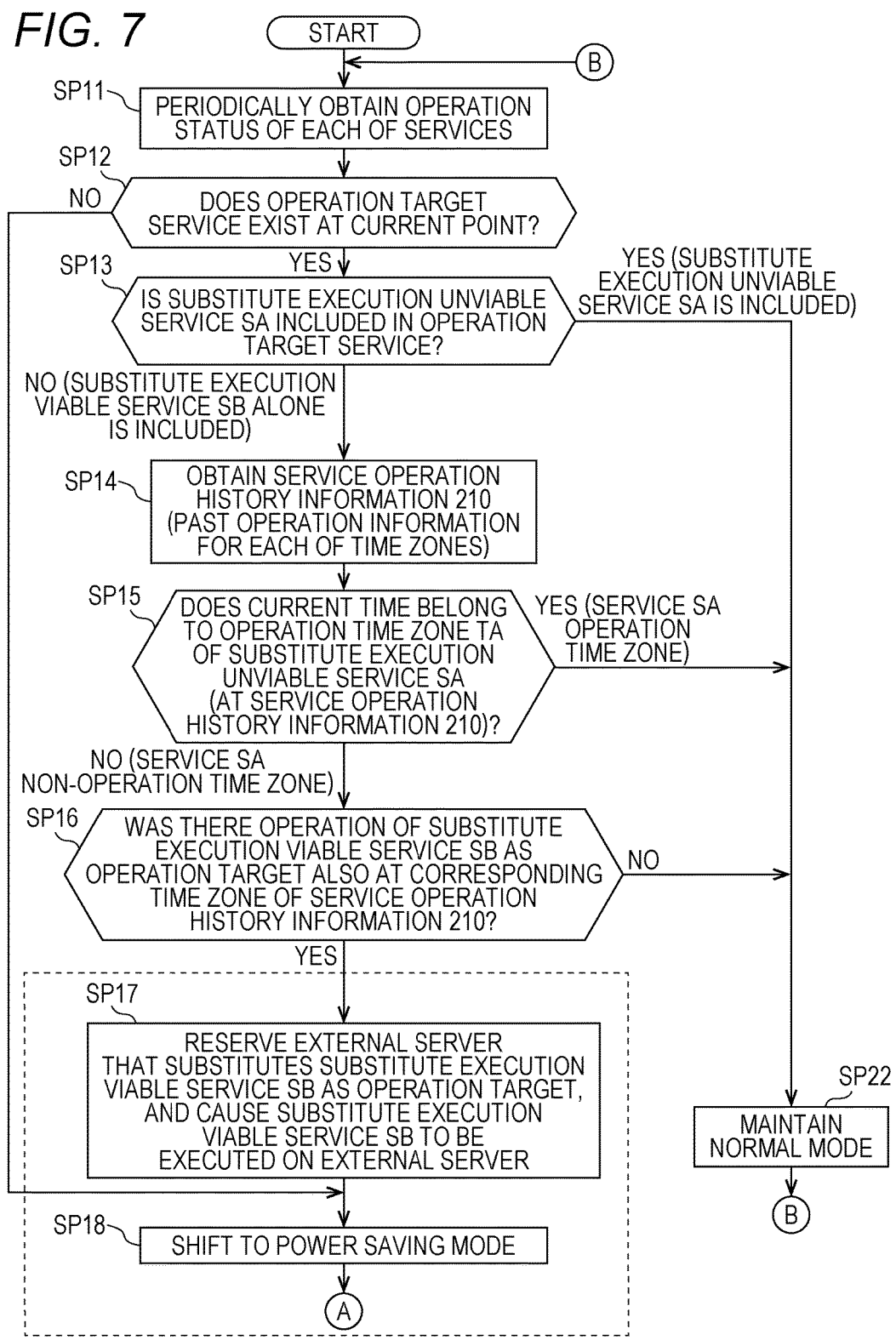
FIG. 7 is a flowchart illustrating operation of an MFP in a normal mode.

Thereafter, the processing proceeds to step SP11 in FIG. 7.

In contrast, in a case where a judgment is made to the effect that the operation target service has been in operation in the corresponding time zone in the past in the service operation history information 210, the processing proceeds from step SP36 to step SP37.

In step SP37, a determination is made to the effect that the operation target service is to be processed by substitute execution by an external resource. Subsequently, the MFP 10 reserves an external server (more specifically, one external virtual machine VM 11 in the server 50a, for example) that is to perform substitute execution of the operation target service (substitute execution viable service SB), and causes the reserved external server to execute the substitute execution viable service SB. Note that regarding the service under substitute execution, the MFP 10 continuously reserves the external server under substitute execution and causes the external server to continuously execute the service under substitute execution. Moreover, regarding a new reception service, the MFP 10 newly reserves a substitute execution external server for the new reception service, and causes the newly reserved external server to execute the new reception service. Subsequently, the MFP 10 transitions to the power saving mode on its own. Thereafter, the processing returns to step SP31 and the operation of FIG. 8 is executed again.

According to the above operation, in a case where, at the time point of returning from the power saving mode, the time point of returning belongs to the operation time zone TA in the operation history of the substitute execution unviable service SA and where there is a service under substitute execution being processed by substitute execution by the external resource (YES in step SP35), a determination is made to the effect that the execution of the service under substitute execution by the external resource is to be stopped and that the service under substitute execution is to be executed by the MFP 10 (step SP41). This configuration makes it possible to appropriately suppress the use of external resources.

Furthermore, a determination is made to the effect that the execution of the service under substitute execution by the external resource is to be stopped and that the service under substitute execution is to be executed on the MFP 10 (step SP41) also in a case where it is judged at the time point of returning from the power saving mode, that the time point of returning does not belong to the operation time zone (TB) in the operation history of the service under substitute execution (SB) (NO in step SP36). This also makes it possible to appropriately suppress the use of external resources.

In contrast, in a case where it is judged, at the time point of returning from the power saving mode, that the time point of returning does not belong to the operation time zone TA of the substitute execution unviable service SA in the operation history and that the time point of returning belongs to the operation time zone (TB) in the operation history of the service under substitute execution (SB) (YES in step SP36), then, it is judged that it is highly likely that the service under substitute execution (SB) is going to be continuously executed in the current time zone. Then, a determination is made to the effect that execution of the service under substitute execution (SB) by the external resource is to be continued (step SP37). Therefore, it is possible to continuously execute, by using the external resource, a specific service (service under substitute execution (SB)) that is highly likely to be continuously executed in the current time zone. That is, it is possible to appropriately continue the use of external resources. Furthermore, as will be described below, it is also possible to efficiently prevent frequent swings of the execution device of the specific service.

Here, in a case where the MFP 10 has returned from the power saving mode due to a certain factor, the MFP 10 can then return to the power saving mode again after removal of the certain factor. However, if the execution of the specific service (SB) under substitute execution by the external resource at the time point of returning from the power saving mode due to the certain factor immediately stops to shift the execution of the specific service to the MFP 10, the MFP 10 cannot return (shift) to the power saving mode due to execution of the specific service. To avoid this, that is, in order to return the MFP 10 to the power saving mode, it is necessary to again change the execution subject of the specific service from the MFP 10 to an external resource. That is, frequent swings of the execution subject of the specific service would arise. Particularly, in a case where it is highly likely that the specific service (SB) will be continuously executed in the current time zone, the state in which the specific service is to be operated continues even at a time point where the certain factor is resolved. Therefore, it is high likely that frequent swings of the execution subject of the specific service will occur in order to stop execution on the MFP 10.

To manage this, with the determination made to the effect that the execution of the specific service by the external resource is to be continued (step SP37) after it is judged that the time point of returning from the power saving mode belongs to the operation time zone of the specific service (SB) under substitute execution in the operation history (YES in step SP36), it is possible to efficiently prevent frequent swings of the execution device of the specific service.

Note that while the first embodiment performs the operation of FIG. 7, the present invention is not limited to this, and for example, the operation of FIG. 19 may be performed in place of the operation of FIG. 7. In FIG. 19, the processing of step SP21 is performed immediately before step SP22. Specifically, in a case where the judgment is YES in step SP13, in a case where the judgement is YES in step SP15, or in a case where the judgment is NO in step SP16, the processing proceeds to step SP21. In step SP21, processing similar to that of step SP41 (FIG. 8) is performed. According to this, in a case where there is an external resource that has been executing the service under substitute execution in particular, the external resource is released and the service under substitute execution is executed by the MFP 10.

2. Second Embodiment

In the above-described first embodiment, description in step SP17 (FIG. 7) and SP37 (FIG. 8) is given on the assumption that an external resource (external server 50, etc.) that processes each of substitute execution viable services SB by substitute execution is reserved for all the substitute execution viable services SB as operation targets.

In the second embodiment, a mode including additional operation or the like in a case where an external resource related to a part of the services among all the substitute execution viable services SB as the operation targets cannot be reserved in step SP17 (and/or step SP37) will be described.

Figure 16:
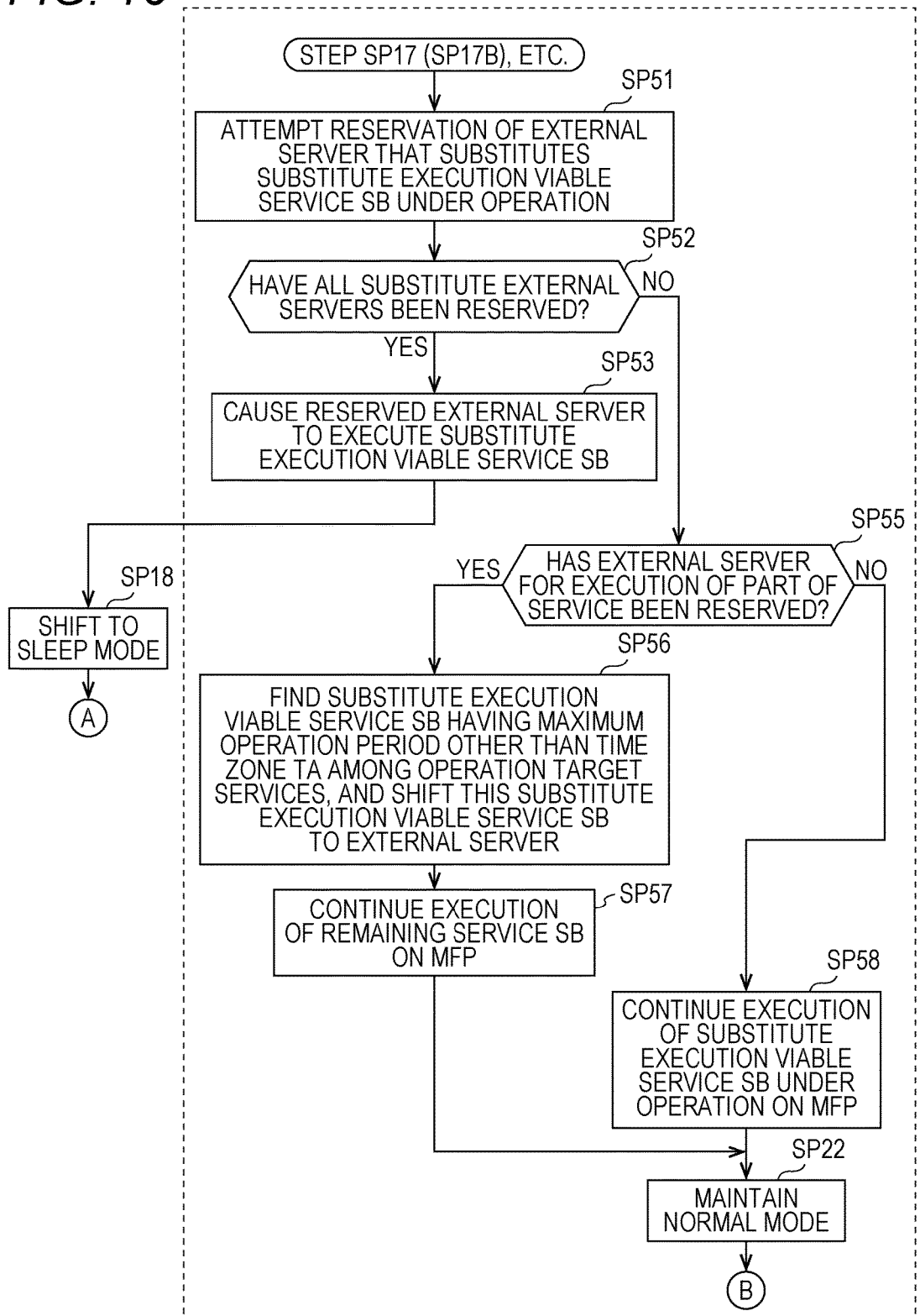
FIG. 16 is a flowchart illustrating operation according to a second embodiment (regarding a portion of FIG. 7)

FIG. 16 is a flowchart illustrating operation in the second embodiment concerning the part surrounded by the broken line in FIG. 7. In other words, it is a flowchart illustrating in detail the operation of step SP17 (SP17B) and SP18 according to the second embodiment.

When a judgment of YES is made in step SP16 of FIG. 7, the operation of FIG. 16 is executed. Note that herein a judgment is made to the effect that each of two or more operation target services is operating in the corresponding time zone in the past in the service operation history information 210 (step SP16), and it is assumed that a determination is made to the effect that the two or more operation target services are to be processed by substitute execution by external resources.

In step SP51 of FIG. 16, when the MFP 10 determines that the two or more operation target services are to be processed by substitute execution by external resources, the MFP 10 attempts reservation of each of external servers (external resources) that would substitute the two or more operation target services (and the substitute execution viable services SB).

In step SP52, it is judged whether or not all the external resources for executing all of the two or more operation target services (services determined to be executed by external resources (external servers, etc.)) have been reserved.

In a case where all of the plurality of external servers (external resources) for executing the two or more operation target services have been reserved, the processing proceeds from step SP52 to step SP53. In step SP53, the MFP 10 causes each of the reserved external servers to perform each of the substitute execution viable services SB by substitute execution.

In a case where none of the external servers (external resources) for executing the two or more operation target services have been reserved, the processing proceeds from step SP52 through step SP55 to step SP58. In step SP58, the execution of the two or more operation target services by the external resource is abandoned, and the two or more operation target services are executed in the MFP 10. Thereafter, the normal mode is maintained (step SP22), and then the processing returns to step SP11 (FIG. 7).

In contrast, in a case where an external server (external resource) for executing some of the two or more operation target services cannot be reserved, the processing proceeds from step SP52 through step SP55 to step SP56.

In step SP56, the MFP 10 prioritizes reserving external resources for a specific service among the two or more operation target services. Here, the specific service is a service having the maximum total time in the operation time zone in the operation history, which is the maximum total time in a time zone other than the operation time zone TA of the substitute execution unviable service SA, among the two or more operation target services.

For example, in a case where the operation in FIGS. 7 and 16 is executed at the time point 6:30 am, and when the services S1 and S3 are operation target services as illustrated in FIG. 6, a determination is made to the effect that the two services S1 and S3 are to be processed by substitute execution by external resources (for example, two external virtual machines). There might be cases, however, where it is possible to reverse only one external virtual machine (for example, one external virtual machine in the server 50a) depending on the operation status of external resources, or the like.

In such a case, the MFP 10 selects a service having the maximum total time in the operation time zone in the operation history (and the maximum total time in a time zone other than the operation time zone TA of the substitute execution unviable service SA) from among the two or more operation target services, and preferentially allocates this service to the reserved external resource (the external virtual machine) (step SP56).

In the service operation history information 210 of FIG. 5, "14 hours" is the total time of the time zones other than the operation time zone TA of the substitute execution unviable service SA (that is, the total of "0:00 to 8:00" and "18:00 to 24:00") among the total time of the operation time zones (all time zones) of the service S1. In contrast, "two hours" is the total time of the time zones other than the operation time zone TA of the substitute execution unviable service SA (that is, the total of "0:00 to 8:00" and "18:00 to 24:00") among the total time of the operation time zones ("6:00 to 8:00") of the service S3. Therefore, the total time (14 hours) of the service S1 is the maximum in the time zones other than the operation time zone TA of the substitute execution unviable service SA. In this case, the service having the maximum total time (total time of the operation time in the time zone other than the time zone TA) S1 (which is a service having the maximum operation time (also referred to as a longest operation service)) out of the operation target services at a certain time point is preferentially allocated to the reserved external resource (for example, one external virtual machine in the server 50*a*).

Subsequently, the MFP 10 causes the one external virtual machine in the server 50*a* to execute the service S1 (step SP56).

Furthermore, the remaining service S3 (service S3 that could not be allocated to an external resource) is executed by the MFP 10 itself (step SP57).

Thereafter, the processing returns to step SP11 (FIG. 7) via step SP22.

With execution of the operation as described above, the service S1 having the maximum operation time in the time zone other than the operation time zone TA of the substitute execution unviable service SA is preferentially executed by an external resource (step SP56) among the two or more operation target services (for example, the two services S1 and S3), it is highly likely that one service will be executed for the comparatively long time in the same external resource. Therefore, it is possible to suppress occurrence of switching processing (switching of services executed by the external resources) among the plurality of services (that is, occurrence of overhead). In addition, the occurrence of the switching process is suppressed, and this leads to suppression of returning to sleep (on the MFP 10) for the execution of the switching processing by the MFP 10, making it possible to suppress an increase in the operation time of the service executed on the MFP 10, enabling increasing the sleep time of the MFP 10. In addition, since the occurrence of the data transfer operation by the switching processing can be suppressed, it is possible to suppress an increase in the processing time of the MFP 10 in the normal mode and an increase in the data communication cost accompanying the data transfer operation.

For example, in the above example (refer to FIG. 5), assuming that a certain service is occasionally allocated to an external resource at each of time points, it is possible that the service S1 will be allocated at time of "4:00" and the service S3 will be allocated at "6:00" individually to external resources. In this case, switching processing from service S1 to service S3 occurs at "6:00".

Figure 17:
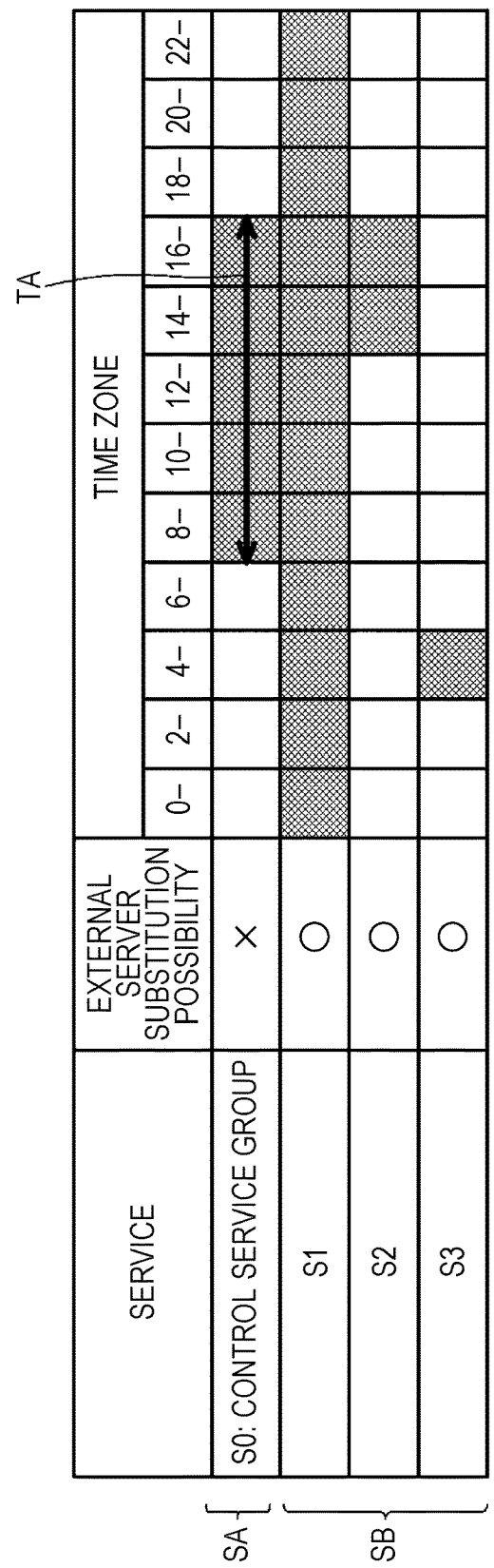
FIG. 17 is a diagram illustrating another example of service operation history information.

Alternatively, it is assumed that there is a mode in which a certain service is allocated to an external resource at each of time points in the service operation history information 210 (212) of FIG. 17 (service operation history information different from the service operation history information 210 (211) in FIG. 5). In this case, it might be possible that the service S1 is allocated to the external resource at the time point "2:00", the service S3 is allocated to the external resource at the time point "4:00", and the service S1 is allocated to the external resource at the time point "6:00". At this time, switching processing from service S1 to service S3 occurs at "4:00", and switching processing from service S3 to service S1 occurs at "6:00."

In contrast, in the operation example of the second embodiment, such switching processing is not necessary. Specifically, since the service S1 is always allocated to the external resource in the period of "0:00 (or 18:00 of the previous day) to 8:00", the switching processing would not occur in this period. Therefore, it is possible to suppress occurrence of switching processing (switching of services executed by the external resources) among the plurality of services S1 and S3.

Note that although the operation in FIG. 7 (operation in the normal mode) is mainly illustrated here, the present invention is not limited to this, and similar modification is possible also with respect to the operation in FIG. 8 (opera-tion in the power saving mode). In other words, similar modifications can be made to the operation in steps SP37 and SP38. Specifically, operation similar to that in FIG. 16 may be performed as the operation of steps SP37 and 38 at reallocating (reassigning) the service to the external resource at the time point of returning from the power saving mode (refer to FIG. 8).

3. Third Embodiment

In the second embodiment, in a case in step SP56 where it is difficult to reserve an external resource for executing some of the two or more operation target services determined to be executed by the external resource (in other words, in a case where not all the external resources for executing the two or more operation target services can necessarily be reserved), reservation of an external resource for a specific service among the two or more operation target services is prioritized.

In particular, in the second embodiment, the specific service is a service having the maximum total time in the operation time zone in the operation history, which is the maximum total time in a time zone other than the operation time zone TA of the substitute execution unviable service SA, among the two or more operation target services.

In the third embodiment, in a case where it is difficult to reserve an external resource for executing some of the two or more operation target services determined to be executed by the external resource, reservation of an external resource for a specific service among the two or more operation target services is prioritized. Note that the specific service is a service having the maximum duration time (duration time of the operation time zone) from a time point corresponding to a certain time point (current time point, etc.) in the operation history among the two or more operation target services, which is the duration time in the time zone other than the operation time zone TA of the substitute execution unviable service SA.

Here, it is assumed that the service operation history information 210 (213) of FIG. 18 exists in place of the service operation history information 210 of FIG. 5.

For example, when the services S1 and S3 are operation target services in a case where the operation in FIG. 7 and FIG. 16 is executed at the time point 2 am, a determination is made to the effect that both of the two services S1 and S3 are to be processed by substitute execution by external resources (for example, two external virtual machines). Again, it is assumed that there might be cases where it is possible to reverse only one external virtual machine (for example, one external virtual machine in the server 50*a*) depending on the operation status of external resources, or the like.

In such a case, the MFP 10 selects a service having the maximum duration time of an operation time zone from a time point ("2 am") in the past corresponding to (current) "2 am" in the operation history, which is the duration time in the time zone other than the time zone TA (the operation time zone TA of the substitute execution unviable service SA), among the two or more operation target services, and preferentially allocates the selected service to the reserved external resource (the external virtual machine).

In the service operation history information 210 of FIG. 18, the duration time of the services S1 and S3 from the current time point (2 am) in the time zone ("0:00 to 8:00" and "18:00 to 24:00") other than the operation time zone TA of the substitute execution unviable service SA, are "two hours" and "six hours", respectively. Specifically, the duration time of the service S1 is "two hours" from 2:00 to 4:00, while the duration time of the service S3 is "six hours" from 2:00 to 8:00.

Therefore, the duration time (six hours) of the service S3 as the duration time from the current time point is the maximum in the time zones other than the operation time zone TA of the substitute execution unviable service SA.

In this case, the service having the maximum duration time (duration time from the current time point in the time zone other than the time zone TA) S3 described above (which is a service having the maximum duration time (also referred to as a longest duration service)) out of the operation target services at a certain time point is preferentially allocated to the reserved external resource (for example, one external virtual machine in the server 50*a*).

With execution of the operation as described above, the service S3 having the maximum duration time in the time zone other than the operation time zone TA of the substitute execution unviable service SA is preferentially executed by an external resource (step SP56) among the two or more operation target services (for example, the two services S1 and S3), it is highly likely that one service will be executed for the comparatively long time in the same external resource. Therefore, it is possible to suppress occurrence of switching processing (switching of services executed by the external resources) among the plurality of services. In addition, the occurrence of the switching process is suppressed, and this leads to suppression of returning to sleep (on the MFP 10) for the execution of the switching processing by the MFP 10, making it possible to suppress an increase in the operation time of the service executed on the MFP 10, enabling increasing the sleep time of the MFP 10. In addition, since the occurrence of the data transfer operation by the switching processing can be suppressed, it is possible to suppress an increase in the processing time of the MFP 10 in the normal mode and an increase in the data communication cost accompanying the data transfer operation.

For example, in the above example (refer to FIG. 18), in a case where a certain service is occasionally allocated to an external resource, it is conceivable to have a mode in which the service S1 will be allocated at the time point "2:00", the service S3 will be allocated at the time point "4:00", and the service S1 will be allocated at the time point "6:00", individually to external resources. In this case, switching processing from service S1 to service S3 occurs at "4:00," and switching processing from service S3 to service S1 further occurs at "6:00."

In contrast, in the operation example of the third embodiment, such switching processing is not required. Specifically, since the service S3 is always allocated to the external resource in the period of "2:00 to 8:00", the switching processing would not occur in this period. Therefore, it is possible to suppress occurrence of switching processing (switching of services executed by the external resources) among the plurality of services S1 and S3.

Note that although the operation in FIG. 7 (operation in the normal mode) is mainly illustrated here, the present invention is not limited to this, and similar modification is possible also with respect to the operation in FIG. 8 (operation in the power saving mode). In other words, similar modifications can be made to the operation in steps SP37 and SP38.

4. Modification Examples

Although the embodiments of the present invention have been described above, the present invention is not limited to the above description.

For example, while each of the above embodiments describes the device information acquisition service S1, the document processing service S2, and the user management service S3 as examples of the substitute execution viable services SB, the present invention is not limited thereto, and the substitute execution viable services SB may be other various services such as image processing services (for example, service of executing OCR processing on scanned documents (document or the like stored in a box of the MFP 10).

Furthermore, while each of the above embodiments or the like describes a mode in which the operation from step SP33 is performed after returning from the power saving mode (steps SP31, SP32) in response to a request from an external application in FIG. 8, as an example, the present invention is not limited to this mode. For example, the operation from step SP33 may be performed after returning from the power saving mode in response to the detection of the user operation on the operation unit 6 (operation panel unit 6*c*, etc.) of the MFP 10.

Furthermore, while in each of the above embodiments or the like, in a case where the operation target service includes a substitute execution unviable service SA, a determination is made to the effect that all the operation target services are to be executed by the MFP 10 (steps SP13, SP22 (FIG. 7)), the present invention is not limited to this processing. Specifically, it is allowable to configure such that, in a case where the operation target service includes the substitute execution unviable service SA and the substitute execution viable service SB, a determination is made to the effect that the substitute execution viable service SB is to be always executed by an external resource (the substitute execution unviable service SA alone is to be always executed by the MFP 10).

In each of the above embodiments or the like, step SP16 (FIG. 7) proceeds to step SP17 on condition that both of the two or more substitute execution viable services SB are operating in the corresponding time zone in the service operation history information 210. The present invention, however, is not limited to this.

For example, processing may proceeds from step SP16 to step SP17 even when at least one operation target service (substitute execution viable service SB) out of two or more operation target services is not in operation in the corresponding time zone in the past in the service operation history information 210. In that case, in step SP17 (refer to FIG. 16), the procedure may proceed from step SP52 to step SP55 (similarly to the case where there is a service that could not reserve the substitute device). After the processing of steps SP55 to SP58 is executed, the at least one operation target service not in operation in the corresponding time zone in the past may be executed by the MFP 10 (having the normal mode) (step SP22).

The similar applies to steps SP36 and SP37 (FIG. 8).

In each of the above-described embodiments or the like, an execution device of each of the operation target services that is to be operated at the current time point (time point in current time) is individually determined. The present invention, however, is not limited to this configuration. For example, it is allowable to configure such that the execution device of each of the operation target services that is to be operated at each of future time point (time point in the future) is individually determined beforehand (in advance). More specifically, in a case where a service to be operated in a certain day can be estimated (predicted) beforehand (including a case where an operation target service is reserved in advance) or the like, it is allowable to determine the execution device of each of the operation target services to be operated in each of the time zones within 24 hours individually on a daily schedule (for example, at 0:00 every day). In this manner, it is allowable to determine the service execution device beforehand at a time point prior to the execution time of the operation target service (reservation fixing time point, or the like). Moreover, similarly to the above embodiments, it is only required to perform reservation (and release) of the external resources.

Moreover, while each of the embodiments or the like is an exemplary case where the external applications (AP 1, AP 2, AP 3, . . . ) are installed in the client 70. The present invention, however, is not limited to this configuration, and they may be installed in a server such as a cloud server (a server other than the server 50 that executes the substitute processing). Briefly, the external application may be a server application. In other words, a service requesting device that requests a service from the MFP 10 is not limited to the client 70, and may be a server.

Although embodiments of the present invention have been described and illustrated in detail, the disclosed embodiments are made for purposes of illustration and example only and not limitation. The scope of the present invention should be interpreted by terms of the appended claims.

What is claimed is:

1. An image processing apparatus comprising
a hardware processor that is capable of performing mode control of causing the image processing apparatus to transition from a first operation mode to a second operation mode having power consumption smaller than in the first operation mode at a time when a plurality of services including a service provided in response to a request from an external application is not being executed in the image processing apparatus, obtains service operation history information that is associated with each of the plurality of services and manages service operation status in the past for each of time zones, and determines whether an operation target service being a service to be operated at a certain time point is to be executed by the image processing apparatus or to be executed by an external resource in place of the image processing apparatus,
wherein the plurality of services is classified into a substitute execution viable service being a service executable by the external resource in place of the image processing apparatus and a substitute execution unviable service being a service executable by the image processing apparatus alone out of the image processing apparatus and the external resource and being a service not executable by substitute execution by the external resource, and
in a case where the operation target service is the substitute execution viable service, the hardware processor makes a determination to the effect that the operation target service is to be processed by substitute execution by the external resource on condition that a judgment is made to the effect that the certain time point does not belong to an operation time zone of the substitute execution unviable service in an operation history on the basis of the service operation history information.

2. The image processing apparatus according to claim 1, wherein in a case where the operation target service is the substitute execution viable service, the hardware processor makes a determination to the effect that the operation target service is to be processed by substitute execution by the external resource on condition that a judgment is made to the effect that the operation target service has been in operation for a predetermined ratio or more in a specific time zone in the past corresponding to the certain time point on the basis of the service operation history information.

3. The image processing apparatus according to claim 1, wherein the hardware processor reserves the external resource that executes the operation target service in a case where a determination is made to the effect that the operation target service is to be executed by the external resource in place of the image processing apparatus.

4. The image processing apparatus according to claim 3, wherein the hardware processor determines whether each of the plurality of operation target services is to be executed by the image processing apparatus or by the external resource in a case where there is a plurality of operation target services as a service to be operated at the certain time point, and prioritizes reservation of the external resource for a specific service out of two or more operation target services in a case where the external resource for executing a part of the two or more operation target services determined to be executed by the external resource cannot be reserved, and
the specific service is a service having a maximum total time of an operation time zone in an operation history, being the total time in a time zone other than the operation time zone of the substitute execution unviable service, out of the two or more operation target services.

5. The image processing apparatus according to claim 3, wherein the hardware processor determines whether each of the plurality of operation target services is to be executed by the image processing apparatus or the external resource in a case where there is a plurality of operation target services as a service to be operated at the certain time point, and prioritizes reservation of the external resource for a specific service out of two or more operation target services in a case where the external resource for executing a part of the two or more operation target services determined to be executed by the external resource cannot be reserved, and
the specific service is a service having a maximum duration time of an operation time zone from a time point corresponding to the certain time point in an operation history, being the duration time in a time zone other than the operation time zone of the substitute execution unviable service, out of the two or more operation target services.

6. The image processing apparatus according to claim 1, wherein in a case where there is a plurality of operation target services as a service to be operated at the certain time point, the hardware processor makes a determination to the effect that each of the plurality of operation target services is to be executed by the image processing apparatus in a case where any of the plurality of operation target services is the substitute execution unviable service.

7. The image processing apparatus according to claim 1, wherein the certain time point is a current time point.

8. The image processing apparatus according to claim 1, wherein the certain time point is a future time point.

9. The image processing apparatus according to claim 1, wherein, in a case where a judgment is made to the effect that a time point of returning at which an operation mode of the image processing apparatus is returned from the second operation mode to the first operation mode belongs to an operation time zone of the substitute execution unviable service in an operation history at the time point of returning on the basis of the service operation history information, and when there is a service under substitute execution that is a service being processed by substitute execution by the external resource, the hardware processor makes a determination to the effect that execution of the service under substitute execution by the external resource is to be stopped and the service under substitute execution is to be executed by the image processing apparatus, and releases the external resource that has been executing the service under substitute execution.

10. The image processing apparatus according to claim 9, wherein in a case where there is the service under substitute execution at the time point of returning and when a judgment is made to the effect that the time point of returning does not belong to the operation time zone of the service under substitute execution in the operation history on the basis of the service operation history information, the hardware processor makes a determination to the effect that the execution of the service under substitute execution by the external resource is to be stopped and the service under substitute execution is to be executed by the image processing apparatus, and releases the external resource executing the service under substitute execution.

11. The image processing apparatus according to claim 9, wherein in a case where the service under substitute execution exists at the time point of returning, and when a judgment is made to the effect that the time point of returning does not belong to the operation time zone of the substitute execution unviable service in the operation history and that the time point of returning belongs to the operation time zone of the service under substitute execution in the operation history on the basis of the service operation history information, the hardware processor makes a determination to the effect that the execution of the service under substitute execution by the external resource is to be continued.

12. The image processing apparatus according to claim 1, wherein the substitute execution viable service includes at least one of a device information acquisition service, a document processing service, an image processing service, and a user management service.

13. The image processing apparatus according to claim 1, wherein the external resource includes at least one of a within-LAN server being a server in a same LAN as that of the image processing apparatus, or an outside-LAN server being a server existing outside the LAN.

14. The image processing apparatus according to claim 13, wherein the outside-LAN server includes at least one of an inside-intranet server being a server belonging to a same private network as the image processing apparatus, or an outside-intranet server belonging to a network other than the private network.

15. The image processing apparatus according to claim 1, wherein the external resource includes a virtual server built in a virtual machine in an external device of the image processing apparatus.

16. An image processing system comprising:
an image processing apparatus; and
an external resource capable of processing by substitute execution at least a part of services out of various services received at the image processing apparatus,
wherein the image processing apparatus includes
a hardware processor that is capable of performing mode control of causing the image processing apparatus to transition from a first operation mode to a second operation mode having power consumption smaller than in the first operation mode at a time when a plurality of services including a service provided in response to a request from an external application is not being executed in the image processing apparatus, obtains service operation history information that is associated with each of the plurality of services and manages a service operation status in the past for each of time zones, determines whether an operation target service being a service to be operated at a certain time point is to be executed by the image processing apparatus or to by executed by an external resource in place of the image processing apparatus, and makes a determination to the effect that the operation target service is to be processed by substitute execution by the external resource on condition that a judgment is made to the effect that the certain time point does not belong to an operation time zone of the substitute execution unviable service in an operation history on the basis of the service operation history information in a case where the operation target service is the substitute execution viable service, and
the plurality of services is classified into a substitute execution viable service being a service executable by the external resource in place of the image processing apparatus and a substitute execution unviable service being a service executable by the image processing apparatus alone out of the image processing apparatus and the external resource and being a service not executable by substitute execution by the external resource.

17. An image processing apparatus control method comprising:
a) obtaining service operation history information that is associated with each of a plurality of services including a service supplied in response to a request from an external application being the plurality of services that can be received at the image processing apparatus, and that manages a service operation status in the past for each of time zones;
b) determining whether an operation target service being a service to be operated at a certain time point is to be executed by the image processing apparatus or executed by an external resource in place of the image processing apparatus; and
c) transitioning the image processing apparatus from a first operation mode to a second operation mode that has power consumption smaller than that in the first operation mode at a time when the plurality of services is not being executed in the image processing apparatus,
wherein the plurality of services is classified into a substitute execution viable service being a service executable by the external resource in place of the image processing apparatus and a substitute execution unviable service being a service executable by the image processing apparatus alone out of the image processing apparatus and the external resource and being a service not executable by substitute execution by the external resource, and
in the b), in a case where the operation target service is the substitute execution viable service, a determination is made to the effect that the operation target service is to be processed by substitute execution by the external resource on condition that a judgment is made to the effect that the certain time point does not belong to an operation time zone of the substitute execution unviable service in an operation history on the basis of the service operation history information.

18. The control method according to claim 17, wherein, in the b), in a case where the operation target service is the substitute execution viable service, a determination is made to the effect that the operation target service is to be processed by substitute execution by the external resource on condition that a judgment is made to the effect that the operation target service has been in operation for a predetermined ratio or more in a specific time zone corresponding to the certain time point on the basis of the service operation history information.

19. The control method according to claim 17, further comprising
d) reserving the external resource that executes the operation target service in a case where a determination is made in the b) to the effect that the operation target service is to be executed by the external resource in place of the image processing apparatus.

20. The control method according to claim 19, wherein, in the b), in a case where there is a plurality of operation target services as a service to be operated at the certain time point, a determination is made as to whether each of the plurality of operation target services is to be executed by the image processing apparatus or by the external resource,
in the d), reservation of the external resource for a specific service is prioritized out of two or more operation target services in a case where the external resource for executing a part of the two or more operation target services determined to be executed by the external resource cannot be reserved, and
the specific service is a service having a maximum total time of an operation time zone in an operation history, being the total time in a time zone other than the operation time zone of the substitute execution unviable service, out of the two or more operation target services.

21. The control method according to claim 19, wherein, in the b), in a case where there is a plurality of operation target services as a service to be operated at the certain time point, a determination is made as to whether each of the plurality of operation target services is to be executed by the image processing apparatus or by the external resource,
in the d), reservation of the external resource for a specific service is prioritized out of two or more operation target services in a case where the external resource for executing a part of the two or more operation target services determined to be executed by the external resource cannot be reserved, and
the specific service is a service having a maximum duration time, being the duration time of the operation time zone from a time point corresponding to the certain time point in the operation history and being the duration time in a time zone other than the operation time zone of the substitute execution unviable service, out of the two or more operation target services.

22. The control method according to claim 17, wherein, in the b), in a case where there is a plurality of operation target services as a service to be operated at the certain time point, a determination is made to the effect that each of the plurality of operation target services is to be executed by the image processing apparatus in a case where any of the plurality of operation target services is the substitute execution unviable service.

23. The control method according to claim 17, further comprising
e) determining, at a time point of returning at which the operation mode of the image processing apparatus is returned from the second operation mode to the first operation mode, whether each of the services to be operated at the time point of returning is to be executed by the image processing apparatus or to be executed by the external resource in place of the image processing apparatus,
wherein, in the e), in a case where a judgment is made to the effect that the time point of returning belongs to an operation time zone of the substitute execution unviable service in an operation history on the basis of the service operation history information, and when there is a service under substitute execution that is a service being processed by substitute execution by the external resource, then, a determination is made to the effect that execution of a service under substitute execution by the external resource is to be stopped and the service under substitute execution is to be executed by the image processing apparatus, and the external resource that has been executing the service under substitute execution is released.

24. The control method according to claim 23, wherein, in the e), in a case where the service under substitute execution exists at the time point of returning, and when a judgment is made to the effect that the time point of returning does not belong to the operation time zone of the service under substitute execution in the operation history on the basis of the service operation history information, then, a determination is made to the effect that the execution of the service under substitute execution by the external resource is to be stopped, and the service under substitute execution is to be executed by the image processing apparatus, and the external resource executing the service under substitute execution is released.

25. The control method according to claim 23, wherein, in the e), in a case where the service under substitute execution exists at the time point of returning, and when a judgment is made to the effect that the time point of returning does not belong to the operation time zone of the substitute execution unviable service in the operation history and that the time point of returning belongs to the operation time zone of the service under substitute execution in the operation history on the basis of the service operation history information, then, a determination is made to the effect that the execution of the service under substitute execution by the external resource is to be continued.

26. A non-transitory recording medium storing a computer readable program causing a computer incorporated in the image processing apparatus to perform the control method according to claim 17.

* * * * *